United States Patent
Nishijima et al.

(10) Patent No.: US 12,195,608 B2
(45) Date of Patent: Jan. 14, 2025

(54) COMPOSITE PARTICLES, COMPOSITE-PARTICLE COMPOSITION, AND METHOD FOR PRODUCING COMPOSITE-PARTICLE COMPOSITION

(71) Applicants: TOPPAN INC., Tokyo (JP); THE UNIVERSITY OF TOKYO, Tokyo (JP)

(72) Inventors: Nao Nishijima, Tokyo (JP); Shuji Fujisawa, Tokyo (JP)

(73) Assignees: TOPPAN INC., Tokyo (JP); THE UNIVERSITY OF TOKYO, Tokyo (JP)

( * ) Notice: Subject to any disclaimer, the term of this patent is extended or adjusted under 35 U.S.C. 154(b) by 671 days.

(21) Appl. No.: 17/394,962

(22) Filed: Aug. 5, 2021

(65) Prior Publication Data
US 2021/0363329 A1  Nov. 25, 2021

Related U.S. Application Data

(63) Continuation of application No. PCT/JP2020/005949, filed on Feb. 17, 2020.

(30) Foreign Application Priority Data

Feb. 19, 2019  (JP) .................. 2019-027817

(51) Int. Cl.
| | |
|---|---|
| C08L 1/02 | (2006.01) |
| C08B 37/00 | (2006.01) |
| C08B 37/08 | (2006.01) |
| C08F 2/16 | (2006.01) |
| C08F 2/22 | (2006.01) |
| C08F 2/44 | (2006.01) |
| C08F 12/36 | (2006.01) |
| C08J 3/12 | (2006.01) |
| C08L 5/08 | (2006.01) |

(52) U.S. Cl.
CPC .......... *C08L 1/02* (2013.01); *C08B 37/0003* (2013.01); *C08B 37/003* (2013.01); *C08F 2/16* (2013.01); *C08F 2/22* (2013.01); *C08F 2/44* (2013.01); *C08F 12/36* (2013.01); *C08J 3/126* (2013.01); *C08L 5/08* (2013.01); *C08J 2401/02* (2013.01); *C08J 2405/08* (2013.01); *C08L 2205/16* (2013.01)

(58) Field of Classification Search
CPC .......... C08L 1/02; C08L 5/08; C08L 2205/16; C08B 37/0003; C08B 37/003; C08F 2/16; C08F 12/36; C08F 2/22; C08F 2/44; C08J 3/126; C08J 2401/02; C08J 2405/08
See application file for complete search history.

(56) References Cited

U.S. PATENT DOCUMENTS

| | | | | |
|---|---|---|---|---|
| 5,238,731 A | * | 8/1993 | Blanch .............. | D06M 15/6436 428/394 |
| 2004/0063849 A1 | * | 4/2004 | Yabuuchi .............. | G03F 7/0388 524/556 |

FOREIGN PATENT DOCUMENTS

| | | |
|---|---|---|
| EP | 2759577 A1 | 7/2014 |
| JP | 2008-001728 A | 1/2008 |
| JP | 2010-180309 A | 8/2010 |
| JP | 2010-216021 A | 9/2010 |
| JP | 2013-014741 A | 1/2013 |
| JP | 5939796 | 6/2016 |
| JP | 2019-006872 A | 1/2019 |
| JP | 2019-038949 A | 3/2019 |
| JP | 2019-181398 A | 10/2019 |
| JP | 2020-132759 A | 8/2020 |
| JP | 2020-177984 A | 10/2020 |
| WO | WO 2010/095574 A1 | 8/2010 |
| WO | WO 2013/042654 A1 | 3/2013 |
| WO | WO 2014/088072 A1 | 6/2014 |
| WO | WO 2019/135384 A1 | 7/2019 |
| WO | WO 2019/208801 A1 | 10/2019 |
| WO | WO 2019/208802 A1 | 10/2019 |
| WO | WO 2021/002290 A1 | 1/2021 |

OTHER PUBLICATIONS

Machine English translation of JP 2013-014741, Mukai et al., Jan. 24, 2013.*

Yuichi Noguchi et al., Complete nanofibrillation of cellulose prepared by phosphorylation, Cellulose, 2017, 24:1295.10.1007/s10570-017-1191-3.

Shuji Fujisawa et al., Magnetically Collectable Nanocellulose-Coated Polymer Microparticles by Emulsion Templating. Langmuir 2020, https://dx.doi.org/10.1021/acs.langmuir.0c01533; 36, 9235-9240; (6 pages).

(Continued)

*Primary Examiner* — Patrick D Niland
(74) *Attorney, Agent, or Firm* — STAAS & HALSEY LLP

(57) ABSTRACT

What is provided is a method for producing a composite-particle composition including a first step of obtaining a dispersion liquid of fine fibers; a second step of coating a surface of liquid droplets of a polymerizable monomer or a polymer with the fine fibers in the dispersion liquid to stabilize the liquid droplets as an emulsion; a third step of polymerizing the liquid droplets of the polymerizable monomer or the polymer to obtain composite particles including the polymer coated with the fine fibers; and a fourth step of adsorbing a compound that forms an ionic bond in a pair with an ionic functional group of the fine fibers onto the fine fibers in the surface of the composite particles.

13 Claims, 8 Drawing Sheets

(56) References Cited

OTHER PUBLICATIONS

Yuto Kaku et al., Synthesis of chitin nanofiber-coated polymer microparticles via Pickering emulsion. Biomacromolecules 2020, 21, 1886-1891; (6 pages).
Shuji Fujisawa et al., Fabrication of ultrathin nanocellulose shells on tough microparticles: Via an emulsion-templated colloidal assembly: Towards versatile carrier materials. Nanoscale 2019, 11, 15004-15009; (7 pages).
Shuji Fujisawa., "Material design of nanocellulose/polymer composites via Pickering emulsion templating" Polymer Journal 2021, 53, 103-109; (7 pages).
International Search Report (Form PCT/ISA/210); mailed Apr. 21, 2020 in corresponding PCT Application No. PCT/JP2020/005949; (2 pages) (2 pages English Translation).
Shuji Fujisawa et al.; "Synthesis of Nanocellulose-stabilized Polymer Microparticles"; 24$^{th}$ Annual Meeting of the Cellulose Society of Japan; Jul. 12-13, 2017, Steering Committee, 24th Annual Meeting of Cellulose Society, JP, Jul. 1, 2017; pp. 17-18, XP009521840; (4 pages).
Extended European Search Report mailed Oct. 26, 2022 in corresponding European Patent Application No. 20759792.3 (9 pages).
Franziska Grüneberger et al., "Fibrillated cellulose in heterophase polymerization of nanoscale poly(methyl methacrylate) spheres", Colloid Polym Sci, vol. 294.
Irina Kalashnikova et al., "New Pickering Emulsions Stabilized by Bacterial Cellulose Nanocrystals", Langmuir, vol. 27, pp. 7471-7479.
Chinese Office Action issue in Chinese Application No. 202080014875.0 dated Aug. 14, 2023.
Japanese Office Action issued in counterpart Japanese Application No. 2021-501963 dated Jan. 9, 2024.

\* cited by examiner

COMPOSITE PARTICLES, COMPOSITE-PARTICLE COMPOSITION, AND METHOD FOR PRODUCING COMPOSITE-PARTICLE COMPOSITION

This application is a Continuation Application based on International Application No. PCT/JP2020/005949, filed on Feb. 17, 2020, which claims priority on Japanese Patent Application No. 2019-027817, filed on Feb. 19, 2019, the contents of which are incorporated herein by reference.

TECHNICAL FIELD

The present invention relates to a fine fiber/polymer composite particle, a composite-particle composition, and a method for producing a composite-particle composition.

BACKGROUND ART

In recent years, there have been active attempts to micronize a cellulose fiber in wood or a chitin fiber until at least one side of the structure thereof is of the order of nanometers in length and use the micronized fiber as a novel functional material.

For example, as shown in Patent Document 1, it is disclosed that a micronized cellulose fiber, that is, a cellulose nanofiber (hereinafter, also referred to as CNF) can be obtained by repeating a mechanical treatment of wood cellulose with a blender or a grinder. It has been reported that the CNF obtained by this method has a minor axis diameter of 10 to 50 nm and a major axis diameter of 1 μm to 10 mm. This CNF has a strength of five or more times larger than that of steel with one-fifth the weight and a very high specific surface area of 250 m2/g or more, and therefore is expected to be used as a resin-reinforcing filler or an adsorbent.

In addition, there have been active attempts to produce CNF by chemically treating a cellulose fiber in wood in advance in order to be easily micronized, and then micronizing the cellulose fiber by a mechanical treatment with a low energy that is about the same as the energy used for a household mixer. The method of the chemical treatment is not particularly limited, but is preferably a method of introducing an anionic functional group into a cellulose fiber to facilitate micronization thereof. The introduction of the anionic functional group into the cellulose fiber makes it easier for a solvent to infiltrate between the cellulose microfibril structures due to an osmotic effect, and therefore the energy required for micronization of a cellulose raw material can be significantly reduced. The method for introducing the anionic functional group is not particularly limited, but for example, Non-Patent Document 1 discloses a method for selectively phosphorylating the surface of a fine fiber of cellulose by using a phosphorylation treatment. In addition, Patent Document 2 discloses a method for carrying out carboxymethylation by reacting cellulose with monochloroacetic acid or sodium monochloroacetate in a high-concentration alkaline aqueous solution. In addition, a carboxy group may be introduced by directly reacting cellulose with a carboxylic acid anhydride-based compound such as maleic acid or phthalic acid gasified in an autoclave.

In addition, there is also a report on a method of selectively oxidizing the surface of a fine fiber of cellulose using 2,2,6,6-tetramethylpiperidinyl-1-oxy radical (TEMPO) which is a relatively stable N-oxyl compound as a catalyst (see, for example, Patent Document 3). The oxidation reaction using TEMPO as a catalyst (TEMPO oxidation reaction) is capable of environmentally friendly chemical modification that proceeds in an aqueous system at room temperature and normal pressure. In a case where the TEMPO oxidation reaction is applied to cellulose in wood, the reaction does not proceed inside the crystal, and only the alcoholic primary carbon of a cellulose molecular chain on the crystal surface can be selectively converted into a carboxy group.

Due to the osmotic effect associated with ionization of carboxy groups selectively introduced into the crystal surface by TEMPO oxidation, it becomes possible to obtain a cellulose single nanofiber (hereinafter, also referred to as CSNF) dispersed in each cellulose microfibril unit in a solvent. The CSNF exhibits high dispersion stability derived from the surface carboxy groups. It has been reported that wood-derived CSNF obtained from wood by a TEMPO oxidation reaction is a structure having a high aspect ratio with a minor axis diameter of about 3 nm and a major axis diameter of several tens of nm to several μm, and an aqueous dispersion liquid and a molded product thereof have high transparency. In addition, Patent Document 4 reports that a laminated film obtained by applying and drying a CSNF dispersion liquid has a gas barrier property.

Here, in the practical use of CNF, there is a problem that a solid content concentration of an obtained CNF dispersion liquid is as low as about 0.1% to 5%. For example, in a case where an attempt is made to transport a micronized cellulose dispersion liquid, this is equivalent to transporting a large amount of solvent, which leads to a problem that the transportation cost rises and the business feasibility is significantly impaired. In addition, even in a case of being used as a resin-reinforcing additive, there are problems that the addition efficiency is deteriorated due to a low solid content and that it is difficult to form a composite in a case where water, which is a solvent, is not compatible with the resin. In addition, in a case of being handled in a water-containing state, there is a risk of putrefaction, so measures such as refrigerated storage and antiseptic treatment are required, which may increase costs.

However, in a case where the solvent of the micronized cellulose dispersion liquid is simply removed by heat drying or the like, the micronized celluloses aggregate with each other, become keratinized, or form a film, making it difficult to exhibit stable functions as an additive. Further, since the solid content concentration of CNF is low, a large amount of energy is applied to the solvent removing step itself by drying, which also contributes to impairing business feasibility.

As described above, since handling CNF in the state of a dispersion liquid itself causes a loss of business feasibility, it is strongly desired to provide a new handling mode in which CNF can be easily handled.

On the other hand, studies have been made to further impart functionality to CNF or CSNF. For example, it is possible to further impart functionality by using carboxy groups on the surface of CSNF. Patent Document 5 discloses a composite in which metal nanoparticles are supported on CSNF (metal nanoparticle-supported CSNF) by reducing and depositing a metal in a state where metal ions are adsorbed onto the carboxy groups on the surface of CSNF. This Patent Document 5 discloses an example in which the metal nanoparticle-supported CSNF is used as a catalyst and reports that the activity of catalyst is improved by making it possible to disperse and stabilize the metal nanoparticles in a state with a high specific surface area.

As described above, various studies have been made on the development of a high-performance member that imparts new functionality to micronized cellulose, such as CNF or CSNF, which is a carbon-neutral material.

In addition, Patent Document 6 discloses a method for producing a chitin nanofiber, which can obtain micronized chitin fibers (chitin nanofibers) in which each one is dispersed. Like cellulose nanofibers, chitin nanofibers are strongly desired to be imparted with a new handling mode in which the chitin nanofibers can be easily handled or with new functionality.

On the other hand, a variety of microparticles and microcapsules have conventionally been put into practical use as functional materials in various fields. The microparticle is usually a micro size-order particle formed from various polymers and is used as a filler, a spacer, an abrasive, or the like. In addition, attempts have been made to impart and express further functionality by forming a microcapsule structure in which the microparticle is used as a core material and the surface of the particle is coated with a wall film. Specifically, a functional material such as a magnetic substance, a pharmaceutical product, an agricultural chemical, a fragrance, an adhesive, an enzyme, a pigment, or a dye is incorporated into a core material, which is followed by microencapsulation, thus making it possible to protect the functional material and control the release behavior thereof. It is also possible to further impart a functional material to the wall film itself, which coats the core material.

In this regard, the micro size-order microparticles have a high specific surface area and therefore generally tend to aggregate with each other, which presents a problem of dispersion stability. In addition, the micro size-order microparticles are required to have biodegradability and biocompatibility depending on the application thereof.

As described above, it is also strongly desired to provide a new handling mode in which microparticles can be easily handled.

CITATION LIST

Patent Documents

[Patent Document 1]
Japanese Unexamined Patent Application, First Publication No. 2010-216021
[Patent Document 2]
PCT International Publication No. WO 2014/088072
[Patent Document 3]
Japanese Unexamined Patent Application, First Publication No. 2008-001728
[Patent Document 4]
PCT International Publication No. WO 2013/042654
[Patent Document 5]
PCT International Publication No. WO 2010/095574
[Patent Document 6]
Japanese Unexamined Patent Application, First Publication No. 2010-180309

Non-Patent Document

[Non-Patent Document 1]
Noguchi Y, Homma I, Matsubara Y. Complete nanofibrillation of cellulose prepared by phosphorylation. Cellulose. 2017; 24: 1295.10.1007/s10570-017-1191-3

SUMMARY OF THE INVENTION

Technical Problem

The present invention has been made in view of such circumstances, and an object of the present invention is to provide a new handling mode in which cellulose nanofibers or chitin nanofibers can be easily handled while imparting new functionality thereto.

Solution to Problem

In order to achieve the foregoing object, the present invention proposes the following means.

A composite particle according to a first aspect of the present invention is a composite particle including a core particle containing at least one polymer, and a fine fiber layer formed of fine fibers on a surface of the core particle, in which the core particle and the fine fiber are bonded to each other in an inseparable state, and the amount of an ionic functional group of the composite particle is 0.0002 mmol/g or greater and 0.5 mmol/g or less with respect to a dry weight of the composite particle.

In a composite-particle composition according to a second aspect of the present invention, a compound that forms an ionic bond in a pair with the ionic functional group of the fine fiber is adsorbed onto the surface of the composite particle.

A method for producing a composite-particle composition according to a third aspect of the present invention includes a first step of obtaining a dispersion liquid of fine fibers; a second step of coating a surface of liquid droplets of a polymerizable monomer or a polymer with the fine fibers in the dispersion liquid to stabilize the liquid droplets as an emulsion; a third step of polymerizing the liquid droplets of the polymerizable monomer or the polymer to obtain composite particles including the polymer coated with the fine fibers; and a fourth step of adsorbing a compound that forms an ionic bond in a pair with an ionic functional group of the fine fibers onto the fine fibers in a surface of the composite particles.

According to an aspect of the composite particle of the present invention, it is possible to provide a new handling mode in which cellulose nanofibers or chitin nanofibers can be easily handled while imparting new functionality thereto.

DETAILED DESCRIPTION OF THE EMBODIMENTS

First Embodiment

Hereinafter, the first embodiment of the present invention will be described with reference to the accompanying drawings. However, in each of the drawings explained below, the same reference signs are given to portions corresponding to each other, and explanation thereof will be omitted as appropriate for redundant portions. In addition, the present embodiment exemplifies a configuration for embodying the technical idea of the present invention, and is not intended to specify the material, shape, structure, arrangement, dimension, and the like of each part to those set out below. The technical idea of the present invention may be altered and modified in various manners within the technical scope of the claims.

<Composite Particle 5>

Figure 1:
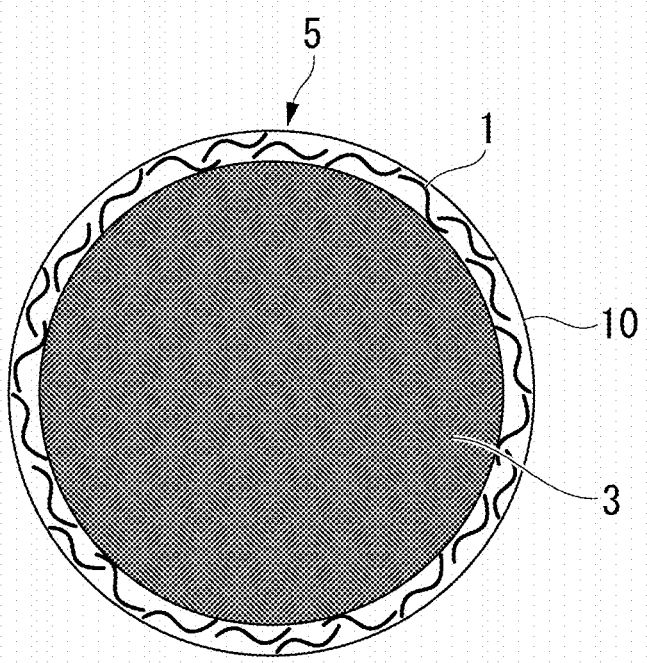
FIG. 1 is a schematic diagram showing a composite particle according to a first embodiment of the present invention.

First, a composite particle 5 of fine fiber/resin particle according to the first embodiment of the present invention will be described. The resin is also referred to as a polymer. FIG. 1 shows a schematic diagram of the composite particle 5 obtained by solidifying an O/W Pickering emulsion using a fine fiber 1 and a polymerizable monomer liquid droplet and/or polymer liquid droplet 2 (hereinafter, also simply referred to as "liquid droplet 2") inside the emulsion.

The composite particle 5 is a composite particle including a core particle 3 having at least one resin (polymer) and a fine fiber layer 10 formed of fine fibers 1 on the surface of the core particle 3, in which the core particle 3 and the fine fibers 1 are bonded to each other in an inseparable state.

The method for producing the composite particle 5 is not particularly limited, and a known method can be used. Examples thereof include a polymerization granulation method in which particles are formed from a polymerizable monomer in a polymerization process (such as an emulsification polymerization method, a suspension polymerization method, a seed polymerization method, or a radiation polymerization method), and a dispersion granulation method in which particles are formed from a polymer solution that has been made into liquid microdroplets (such as a spray dry method, an in-liquid curing method, a solvent evaporation method, phase separation method, or a solvent dispersion cooling method). The details of the production method will be described later.

For example, the composite particle 5 using an emulsion as a template can be prepared in such a manner that the fine fiber 1 is adsorbed onto the interface of the liquid droplet 2 of the core particle 3 dispersed in a hydrophilic solvent 4 to thereby stabilize an O/W Pickering emulsion, and the liquid droplet 2 inside the emulsion is solidified while maintaining the emulsion in a stabilized state.

The solidification of the polymerizable monomer liquid droplet and/or polymer liquid droplet 2 includes (1) polymerizing the polymerizable monomer liquid droplet, (2) solidifying the polymer liquid droplet, and (3) solidifying the polymerizable monomer liquid droplet and the polymer liquid droplet.

The term "inseparable" as used herein means that the fine fiber 1 and the core particle 3 are not separated from each other, and the coating state of the core particle 3 with the fine fiber 1 is maintained even after repeating an operation in which a dispersion liquid containing composite particles 5 is centrifuged to remove a supernatant and then a solvent is added to redisperse the composite particles 5, thereby purifying and washing the composite particles 5, or an operation in which the composite particles 5 are repeatedly washed with a solvent by washing with filtration using a membrane filter. The coating state can be confirmed by observing the surface of the composite particle 5 with a scanning electron microscope. Although the mechanism of binding between the fine fiber 1 and the core particle 3 in the composite particle 5 is not clear, it is presumed that the composite particle 5 is formed using an O/W emulsion stabilized by the fine fiber 1 as a template and the solidification of the liquid droplet 2 proceeds in a state where the fine fiber 1 is in contact with the liquid droplet 2 inside the emulsion; consequently the fine fiber 1 is physically immobilized on the solidified liquid droplet 2, and finally the core particle 3 and the fine fiber 1 reach a state of being inseparable from each other.

Here, the O/W emulsion is also referred to as an oil-in-water emulsion, in which oil is dispersed as oil droplets (oil particles) in water, which is a continuous phase.

In addition, since the composite particle 5 is prepared using, as a template, an O/W emulsion stabilized by the fine fiber 1, the shape of the composite particle 5 is characterized by being a spherical shape derived from the O/W emulsion. Specifically, a fine fiber layer 10 consisting of fine fibers 1 is formed on the surface of the spherical core particle 3 with a relatively uniform thickness. The average thickness of the fine fiber layer 10 can be calculated by cutting the composite particle 5 fixed in an embedding resin using a microtome, observing the cut composite particle 5 with a scanning electron microscope, measuring the thickness of the fine fiber layer 10 in the cross-sectional image of the composite particle 5 at 100 random points on the image, and taking an average value of the measured values. In addition, the composite particle 5 is characterized in that it is uniformly coated with the fine fiber layer 10 having a relatively uniform thickness. Specifically, the coefficient of variation of the thickness value of the fine fiber layers 10 is preferably 0.5 or less and more preferably 0.4 or less.

In addition, the composite particle 5 preferably has an amount of ionic functional groups of 0.0002 mmol/g or greater and 0.5 mmol/g or less with respect to the dry weight of the composite particle 5. The amount of ionic functional groups shown here refers to an amount of the ionic functional groups detected in a case where the composite particles 5 are dispersed using water as a dispersion medium and using a stirrer or the like under conditions that do not change the physical structure of the composite particles. In a case where the amount of ionic functional groups is in this range, the amount of adsorption of the compound can be controlled according to the pH. The amount of ionic functional groups per dry weight of the composite particles 5 can be obtained as follows using a conductivity titration method.

0.5 g of the obtained composite particles 5 is weighed in terms of solid content weight and dispersed in water at a concentration of 1%, and hydrochloric acid is added thereto to adjust the pH to 2.5. After that, a 0.001 M sodium hydroxide aqueous solution is injected at 0.01 ml/30 seconds, and the conductivity and pH are measured every 30 seconds. The measurement is continued until a pH of 11. A titer of sodium hydroxide is obtained from the obtained conductivity curve, and an amount of ionic functional groups is calculated from the corresponding region.

The fine fiber 1 in the present embodiment is micronized cellulose (hereinafter, also referred to as cellulose nanofiber, CNF, or cellulose) and has an anionic functional group on the crystal surface thereof, in which the amount of the anionic functional group is preferably 0.1 mmol or greater and 5.0 mmol or less per 1 g of cellulose. It is possible to obtain composite particles 5 having a uniform particle size and high dispersibility in which the amount of anionic functional groups is uniform.

Further, the fine fiber 1 in the present embodiment preferably has a fiber shape derived from a microfibril structure. Specifically, it is preferable that the fine fiber 1 is fibrous, has a number average minor axis diameter of 1 nm or longer and 1000 nm or shorter, and a number average major axis diameter of 50 nm or longer; and that the number average major axis diameter is 5 or more times longer than the number average minor axis diameter. In addition, the crystal structure of the fine fiber 1 is preferably cellulose type 1.

<Method for Producing Composite Particle 5>

Next, a method for producing the composite particle 5 according to the present embodiment will be described. The method for producing the composite particle 5 according to the present embodiment is a method for producing the composite particle 5 including a step of defibrating a fine fiber raw material in a solvent to obtain a dispersion liquid 4 of fine fibers 1 (first step); a step of coating the surface of the polymerizable monomer liquid droplet and/or polymer liquid droplet 2 with the fine fiber 1 in the dispersion liquid 4 of the fine fibers 1 to stabilize the liquid droplet as an emulsion (second step); a step of solidifying the liquid droplet 2 to obtain the composite particle 5 in which the core particle 3 is coated with the fine fiber 1 (third step); and a step of adsorbing a compound that forms an ionic bond in a pair with an ionic functional group of the fine fiber 1 onto the fine fiber 1 in the surface of the composite particle 5 (fourth step).

Figure 2:
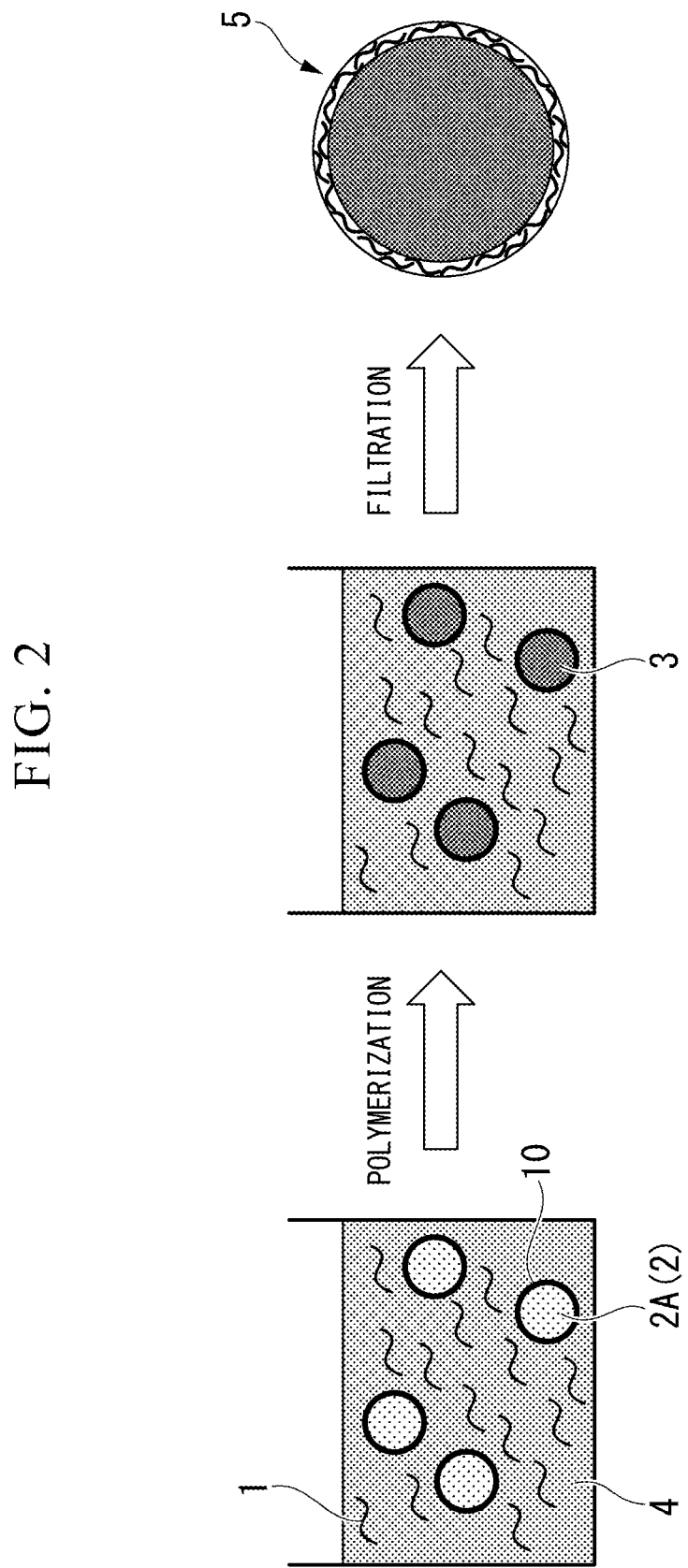
FIG. 2 is a schematic diagram showing a method for producing the composite particle according to the first embodiment of the present invention in which an O/W Pickering emulsion using a fine fiber and a monomer inside the emulsion are polymerized to solidify the emulsion and the monomer.

FIG. 2 is a schematic diagram showing a method for producing the composite particle 5 in which an O/W Pickering emulsion using the fine fiber 1 and a monomer inside the emulsion are polymerized to solidify the emulsion and the monomer.

Figure 3:
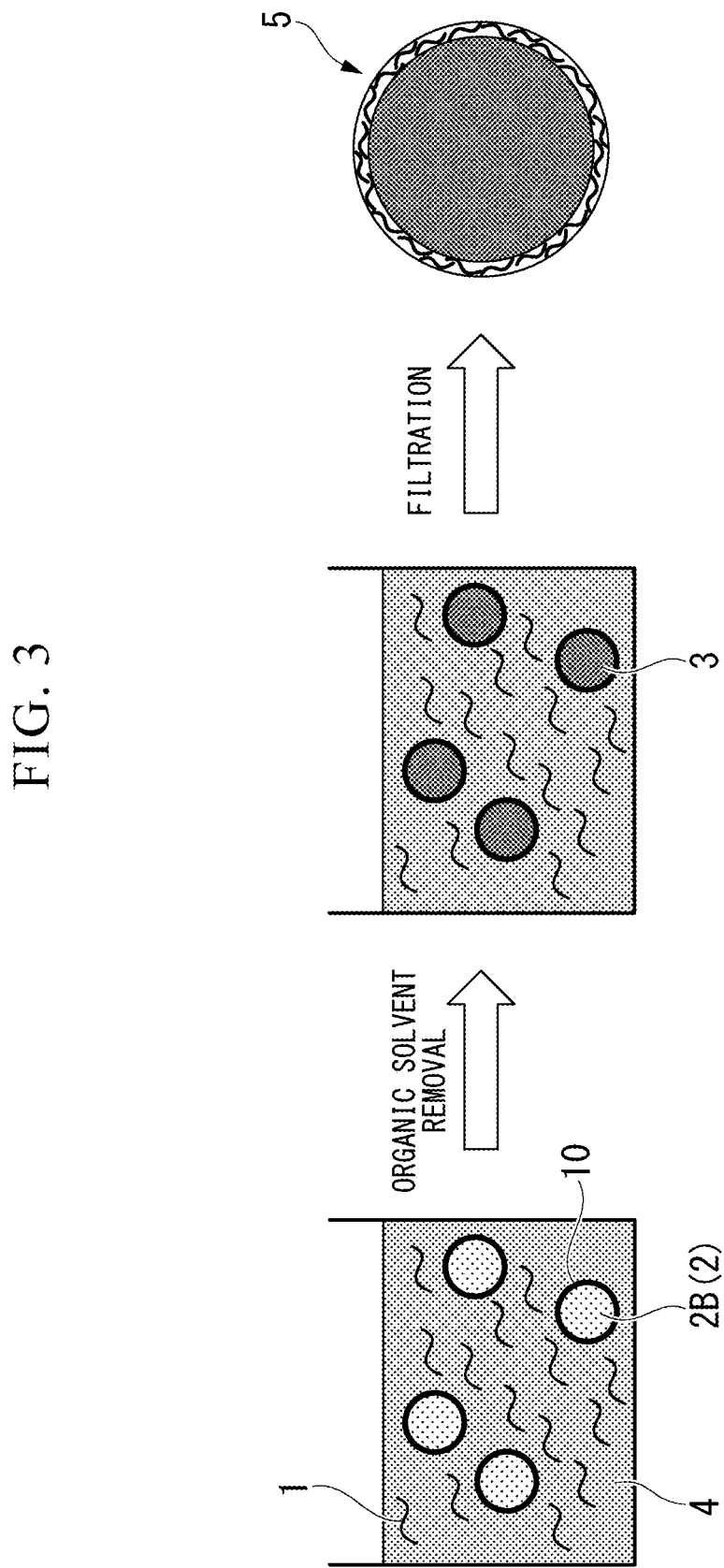
FIG. 3 is a schematic diagram showing a method for producing the composite particle according to the first embodiment of the present invention in which an organic solvent inside an O/W Pickering emulsion using a fine fiber is removed to solidify a dissolved polymer.

FIG. 3 is a schematic diagram showing a method for producing the composite particle 5 in which an organic solvent inside an O/W Pickering emulsion using the fine fiber 1 is removed to solidify a dissolved polymer.

Figure 4:
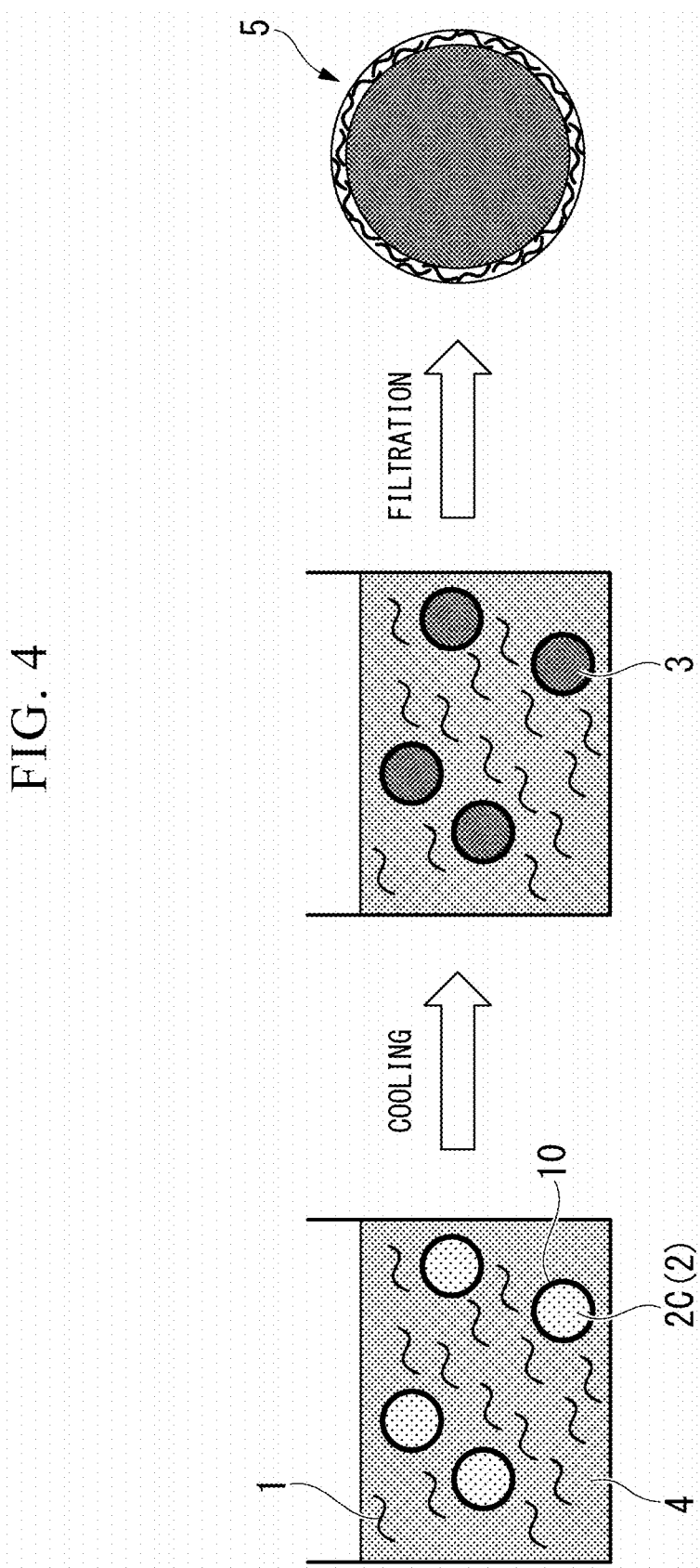
FIG. 4 is a schematic diagram showing a method for producing the composite particle according to the first embodiment of the present invention in which an O/W Pickering emulsion using a fine fiber and a molten polymer inside the emulsion are solidified.

FIG. 4 is a schematic diagram showing a method for producing the composite particle 5 in which an O/W Pickering emulsion using the fine fiber 1 and a molten polymer inside the emulsion are solidified.

Individual steps will be described in detail below. As one embodiment, a case where micronized cellulose is used as the fine fiber 1 will be described as an example.

(First Step)

The first step is a step of defibrating a fine fiber raw material (cellulose raw material) in a solvent to obtain a dispersion liquid 4. First, a variety of cellulose raw materials are dispersed in a solvent to form a suspension. The concentration of the cellulose raw material in the suspension is preferably 0.1% or more and less than 10%. In a case where the concentration of the cellulose raw material is less than 0.1%, the amount of solvent is excessive and therefore the productivity is impaired, which is not preferable. In a case where the concentration of the cellulose raw material is 10% or more, the suspension rapidly thickens with the defibration of the cellulose raw material and therefore it becomes difficult to carry out a uniform defibration treatment, which is not preferable. The solvent used for preparing the suspension preferably contains 50% or more of water. In a case where the percentage of water in the suspension is 50% or less, the dispersion of the fine fibers 1 is inhibited in the step of defibrating the cellulose raw material described later in a solvent to obtain the dispersion liquid 4 of the fine fibers 1. In addition, a hydrophilic solvent is preferable as the solvent contained other than water. The hydrophilic solvent is not particularly limited, but alcohols such as methanol, ethanol, and isopropanol; and cyclic ethers such as tetrahydrofuran are preferable. If necessary, the pH of the suspension may be adjusted in order to increase the dispersibility of cellulose and the resulting fine fibers 1. Examples of the alkaline aqueous solution used for pH adjustment include organic alkalis such as a sodium hydroxide aqueous solution, a lithium hydroxide aqueous solution, a potassium hydroxide aqueous solution, an ammonia aqueous solution, a tetramethylammonium hydroxide aqueous solution, a tetraethylammonium hydroxide aqueous solution, a tetrabutylammonium hydroxide aqueous solution, and a benzyltrimethylammonium hydroxide aqueous solution. A sodium hydroxide aqueous solution is preferable from the viewpoint of cost and the like.

Subsequently, the suspension is subjected to a physical defibration treatment to micronize the cellulose raw material. The method of physical defibration treatment is not particularly limited, and examples thereof include mechanical treatments using a high-pressure homogenizer, an ultra-high-pressure homogenizer, a ball mill, a roll mill, a cutter mill, a planetary mill, a jet mill, an attritor, a grinder, a juicer mixer, a homomixer, an ultrasonic homogenizer, a nanogenizer, aqueous counter collision, and the like. By carrying out such a physical defibration treatment, the cellulose raw material in the suspension can be micronized, thereby obtaining the dispersion liquid 4 of the fine fibers 1 that are micronized until at least one side of the structure thereof is of the order of nanometers in length. In addition, the number average minor axis diameter and number average major axis diameter of the obtained fine fiber 1 can be adjusted depending on the time and the number of times of the physical defibration treatment.

As described above, the dispersion liquid 4 of the fine fibers 1 (dispersion liquid of micronized cellulose) is obtained in which the cellulose is micronized until at least one side of the structure thereof is of the order of nanometers in length. The obtained dispersion liquid 4 can be used as a stabilizer for an O/W emulsion described later, as it is or after dilution, concentration, or the like.

In addition, the dispersion liquid 4 of the fine fibers 1 may contain components other than cellulose and the components used for pH adjustment, if necessary, as long as the effects of the present invention are not impaired. The other components are not particularly limited, and can be appropriately selected from known additives depending on the application of the composite particle 5 and the like. Specific examples thereof include an organometallic compound or a hydrolysate thereof such as alkoxysilane, an inorganic layered compound, an inorganic acicular mineral, an antifoaming agent, an inorganic particle, an organic particle, a lubricant, an antioxidant, an antistatic agent, an ultraviolet absorber, a stabilizer, a magnetic powder, an orientation promoter, a plasticizer, a cross-linking agent, a magnetic substance, a pharmaceutical product, an agricultural chemical, a fragrance, an adhesive, an enzyme, a pigment, a dye, a deodorant, a metal, a metal oxide, and an inorganic oxide.

Since the fine fiber 1 usually has a fiber shape derived from a microfibril structure, the fine fiber 1 used in the production method of the present embodiment preferably has a fiber shape within the range shown below. That is, the shape of the fine fiber 1 is preferably fibrous. In addition, the fibrous fine fiber 1 may have a number average minor axis diameter of 1 nm or longer and 1000 nm or shorter and preferably 2 nm or longer and 500 nm or shorter in the minor axis diameter. Here, in a case where the number average minor axis diameter is shorter than 1 nm, a highly crystalline and rigid micronized cellulose fiber structure cannot be formed, and stabilization of an emulsion and a polymerization reaction using the emulsion as a template cannot be carried out. On the other hand, in a case where the number average minor axis diameter is longer than 1000 nm, the size of the fiber becomes too large to stabilize the emulsion and therefore it becomes difficult to control the size and shape of the resulting composite particle 5. In addition, the number average major axis diameter is not particularly limited, but may be preferably 5 or more times longer than the number average minor axis diameter. In a case where the number average major axis diameter is less than 5 times longer than the number average minor axis diameter, the size and shape of the composite particle 5 cannot be sufficiently controlled, which is not preferable.

The number average minor axis diameter of the micronized cellulose fibers is obtained as an average value of the minor axis diameters (minimum diameters) of 100 fibers measured by observation with a transmission electron microscope or observation with an atomic force microscope. On the other hand, the number average major axis diameter of the micronized cellulose fibers is obtained as the average value of the major axis diameters (maximum diameters) of 100 fibers measured by observation with a transmission electron microscope or observation with an atomic force microscope.

The type and crystal structure of cellulose that can be used as a raw material for the fine fiber 1 are not particularly limited. Specifically, as a raw material consisting of cellulose type I crystals, for example, in addition to wood-based native cellulose, non-wood-based native cellulose can be used such as cotton linter, bamboo, hemp, bagasse, kenaf, bacterial cellulose, tunicate cellulose, and valonia cellulose. Furthermore, regenerated cellulose represented by a rayon fiber and a cuprammonium rayon fiber consisting of cellulose type 11 crystals can also be used. From the viewpoint of easy procurement of material, wood-based native cellulose is preferably used as the raw material. Examples of materials that can be used as wood-based native cellulose include, but are not particularly limited to, materials typically used for producing cellulose nanofibers, such as softwood pulp, hardwood pulp, and waste paper pulp. Softwood pulp is preferable from the viewpoint of easy purification and micronization.

Further, the micronized cellulose raw material is preferably chemically modified. More specifically, it is preferable that an anionic functional group is introduced into the crystal surface of the micronized cellulose raw material.

This is because the introduction of the anionic functional group into the cellulose crystal surface facilitates infiltration of a solvent between the cellulose crystals due to an osmotic effect and therefore facilitates micronization of the cellulose raw material.

Although the type of anionic functional group introduced into the cellulose crystal surface, and the introduction method thereof are not particularly limited, a carboxy group and a phosphate group are preferably used. A carboxy group is preferable from the viewpoint of easy selective introduction thereof into the cellulose crystal surface.

The method for introducing a carboxy group into the surface of the cellulose fibers is not particularly limited. Specifically, for example, carboxymethylation may be carried out by reacting cellulose with monochloroacetic acid or sodium monochloroacetate in a high-concentration alkaline aqueous solution. Alternatively, the cellulose may be allowed to directly react with a carboxylic acid anhydride-based compound such as maleic acid or phthalic acid gasified in an autoclave to introduce a carboxy group. Alternatively, a process may be used which uses a co-oxidant in the presence of an N-oxyl compound such as TEMPO, which has high selectivity for the oxidation of alcoholic primary carbon, while the structure is retained as much as possible under relatively mild water-based conditions. The oxidation using an N-oxyl compound is more preferable for the selectivity of a site for introducing a carboxy group and the reduction of environmental load.

Examples of the N-oxyl compound include TEMPO (2,2,6,6-tetramethylpiperidinyl-1-oxy radical), 2,2,6,6-tetramethyl-4-hydroxypiperidine-1-oxyl, 4-methoxy-2,2,6,6-tetramethylpiperidine-N-oxyl, 4-ethoxy-2,2,6,6-tetramethylpiperidine-N-oxyl, and 4-acetamide-2,2,6,6-tetramethylpiperidine-N-oxyl. Among them, TEMPO, which has high reactivity, is preferable. The amount of the N-oxyl compound used may be the amount as a catalyst and is not particularly limited. Usually, the amount of the N-oxyl compound is about 0.01% to 5.0% by mass with respect to the solid content of the wood-based native cellulose which is subjected to an oxidation treatment.

The oxidation method using an N-oxyl compound may be, for example, a method in which wood-based native cellulose is dispersed in water and subjected to an oxidation treatment in the presence of the N-oxyl compound. In this method, a co-oxidant is preferably used together with the N-oxyl compound. In this case, in the reaction system, the N-oxyl compound is gradually oxidized by the co-oxidant to generate an oxoammonium salt, by which the cellulose is oxidized. According to this oxidation treatment, the oxidation reaction proceeds smoothly even under mild conditions, whereby the efficiency of introducing a carboxy group is improved. In a case where the oxidation treatment is carried out under mild conditions, the crystal structure of the cellulose can be easily maintained.

As the co-oxidant, any oxidant, such as halogen, hypohalous acid, halous acid, perhalogenic acid, salts thereof, halogen oxide, nitrogen oxide, and peroxide, can be used, as long as it can accelerate the oxidation reaction. Sodium hypochlorite is preferable from the viewpoint of availability and reactivity. The amount of the co-oxidant used is not particularly limited as long as it can accelerate the oxidation reaction. Usually, the amount of the co-oxidant is about 1% to 200% by mass with respect to the solid content of the wood-based native cellulose which is subjected to an oxidation treatment.

In addition, together with the N-oxyl compound and the co-oxidant, at least one compound selected from the group consisting of bromide and iodide may be further used in combination. Hence, the oxidation reaction can proceed smoothly, whereby the efficiency of introducing a carboxy group can be improved. As such a compound, sodium bromide or lithium bromide is preferable, and sodium bromide is more preferable from the viewpoint of cost and stability. The amount of the compound used is not particularly limited as long as it can accelerate the oxidation reaction. Usually, the amount of the compound is about 1% to 50% by mass with respect to the solid content of the wood-based native cellulose which is subjected to an oxidation treatment.

The reaction temperature of the oxidation reaction is preferably 4° C. to 80° C. and more preferably 10° C. to 70° C. In a case where the reaction temperature of the oxidation reaction is lower than 4° C., the reactivity of a reagent decreases and therefore the reaction time becomes longer. In a case where the reaction temperature of the oxidation reaction is higher than 80° C., a side reaction is accelerated, a sample becomes low in molecular weight, a highly crystalline and rigid micronized cellulose fiber structure collapses, which makes it difficult to use a micronized cellulose fiber as a stabilizer for an O/W emulsion.

In addition, the reaction time of the oxidation treatment can be appropriately set in consideration of the reaction temperature, the desired amount of carboxy groups, and the like. The reaction time is not particularly limited, but is usually about 10 minutes to 5 hours.

The pH of the reaction system during the oxidation reaction is not particularly limited, but is preferably 9 to 11. In a case where the pH is 9 or higher, the reaction can proceed efficiently. In a case where the pH is higher than 11, side reactions may proceed, which may accelerate the decomposition of the sample. In addition, in the oxidation treatment, as the oxidation proceeds, the pH in the system lowers due to the generation of carboxy groups. Hence, it is preferable to keep the pH of the reaction system at 9 to 11 during the oxidation treatment. Examples of the method for keeping the pH of the reaction system at 9 to 11 include a method of adding an alkaline aqueous solution depending on the lowering of the pH.

Examples of the alkaline aqueous solution include organic alkalis such as a sodium hydroxide aqueous solution, a lithium hydroxide aqueous solution, a potassium hydroxide aqueous solution, an ammonia aqueous solution, a tetramethylammonium hydroxide aqueous solution, a tetraethylammonium hydroxide aqueous solution, a tetrabutylammonium hydroxide aqueous solution, and a benzyltrimethylammonium hydroxide aqueous solution. A sodium hydroxide aqueous solution is preferable from the viewpoint of cost and the like.

The oxidation reaction using an N-oxyl compound can be stopped by adding an alcohol to the reaction system. In this case, the pH of the reaction system is preferably kept within the above range. As the alcohol to be added, a low molecular weight alcohol, such as methanol, ethanol, or propanol, is preferable in order to terminate the reaction quickly. Ethanol is particularly preferable from the viewpoint of safety of by-products generated by the reaction.

The reaction liquid after the oxidation treatment may be directly subjected to a micronizing step; however, in order to remove the catalyst such as an N-oxyl compound, impurities, and the like, the oxidized cellulose contained in the reaction liquid is preferably recovered and washed with a washing liquid. The recovery of oxidized cellulose can be carried out by a known method such as filtration using a glass filter or a nylon mesh having a pore size of 20 μm. The washing liquid used for washing the oxidized cellulose is preferably pure water.

In a case where the obtained TEMPO-oxidized cellulose is subjected to a defibration treatment, a cellulose single nanofiber (CSNF) having a uniform fiber width of 3 nm can be obtained. In a case where CSNF is used as a raw material for the fine fiber 1 of the composite particle 5, the particle size of the resulting O/W emulsion tends to be uniform due to the uniform structure of CSNF.

As described above, CSNF used in the present embodiment can be obtained by a step of oxidizing a cellulose raw material and a step of micronizing the cellulose raw material to obtain a dispersion liquid. In addition, the amount of the carboxy group introduced into CSNF is preferably 0.1 mmol/g or greater and 5.0 mmol/g or less and more preferably 0.5 mmol/g or greater and 2.0 mmol/g or less. In a case where the amount of the carboxy group is less than 0.1 mmol/g, solvent entry due to an osmotic effect does not occur between the cellulose microfibrils, which makes it difficult to micronize and uniformly disperse the cellulose. In addition, in a case where the amount of the carboxy group is greater than 5.0 mmol/g, the cellulose microfibrils become low in molecular weight due to a side reaction associated with a chemical treatment, so that a highly crystalline and rigid micronized cellulose fiber structure cannot be formed, which makes it difficult to use a micronized cellulose fiber as a stabilizer for an O/W emulsion.

(Second Step)

The second step is a step of coating the surface of the polymerizable monomer liquid droplet and/or polymer liquid droplet 2 with the fine fiber 1 in the dispersion liquid 4 of the fine fibers 1 to stabilize the liquid droplet as an emulsion.

Specifically, as shown in FIG. 2 to FIG. 4, the second step is a step in which a polymerizable monomer and/or polymer liquid is added to the dispersion liquid 4 of the fine fibers 1 obtained in the first step; the polymerizable monomer and/or polymer liquid is dispersed as liquid droplets 2 in the dispersion liquid 4 of the fine fibers 1; and the surface of the liquid droplets 2 is coated with the fine fibers 1 to prepare an O/W emulsion stabilized by the fine fibers 1. The polymer liquid is not particularly limited, but can be obtained by melting the polymer or dissolving the polymer in a solvent.

Although the method for preparing an O/W emulsion is not particularly limited, general emulsification treatments, for example, various homogenizer treatments and mechanical stirring treatments can be used. Specific examples thereof include mechanical treatments using a high-pressure homogenizer, an ultrahigh-pressure homogenizer, a universal homogenizer, a ball mill, a roll mill, a cutter mill, a planetary mill, a jet mill, an attritor, a grinder, a juicer mixer, a homomixer, an ultrasonic homogenizer, a nanogenizer, aqueous counter collision, or a paint shaker. In addition, a plurality of mechanical treatments may be used in combination.

For example, in a case where an ultrasonic homogenizer is used, a polymerizable monomer and/or polymer liquid is added to the dispersion liquid 4 of the fine fibers 1 obtained in the first step to prepare a mixed solvent, and the tip of the ultrasonic homogenizer is inserted into the mixed solvent for ultrasonic treatment. The treatment conditions of the ultrasonic homogenizer are not particularly limited. For example, the frequency is generally 20 kHz or more, and the output is generally 10 W/cm2 or more. The treatment time is also not particularly limited, but is usually about 10 seconds to 1 hour.

By the above ultrasonic treatment, the polymerizable monomer liquid droplets and/or polymer liquid droplets 2 are dispersed in the dispersion liquid 4 of the fine fibers 1 to proceed with emulsification. Further, the fine fibers 1 are selectively adsorbed onto the liquid/liquid interface between the liquid droplets 2 and the dispersion liquid 4 of the fine fibers 1, thereby forming a stable structure as an O/W emulsion in which the liquid droplets 2 are coated with the fine fibers 1. The emulsion in which a solid material is adsorbed and stabilized on a liquid/liquid interface, as described above, is academically called a "Pickering emulsion". Although the mechanism by which the Pickering emulsion is formed by the micronized cellulose fibers as described above is not clear, it is presumed that cellulose exhibits amphipathic properties because it has a hydrophilic site derived from a hydroxyl group and a hydrophobic site derived from a hydrocarbon group in a molecular structure thereof and that, due to the amphipathic properties, the cellulose is adsorbed onto the liquid/liquid interface between the hydrophobic monomer and the hydrophilic solvent.

The O/W emulsion structure can be confirmed by observation with an optical microscope. The particle size of the O/W emulsion is not particularly limited, but is usually about 0.1 m to 1000 μm.

In the O/W emulsion structure, the thickness of the fine fiber layer 10 formed on the surface layer of the liquid droplet 2 is not particularly limited, but is usually about 3 nm to 1000 nm. The thickness of the fine fiber layer 10 can be measured using, for example, a cryo-TEM.

The type of the polymerizable monomer that can be used in the second step shown in FIG. 2 is not particularly limited as long as it is a monomer of a polymer, has a polymerizable functional group in a structure thereof, is a liquid at room temperature, is incompatible with water, and is capable of forming a polymer (high molecular weight polymer) by a polymerization reaction. The polymerizable monomer has at least one polymerizable functional group. A polymerizable monomer having one polymerizable functional group is also referred to as a monofunctional monomer. In addition, a polymerizable monomer having two or more polymerizable functional groups is also referred to as a polyfunctional monomer. The type of the polymerizable monomer is not particularly limited, and examples thereof include a (meth) acrylic monomer and a vinyl-based monomer.

In addition, it is also possible to use a polymerizable monomer having a cyclic ether structure such as an epoxy group or an oxetane structure (for example, ε-caprolactone).

The term "(meth)acrylate" is intended to include both "acrylate" and "methacrylate".

Examples of monofunctional (meth)acrylic monomers include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth) acrylate, 3-methoxybutyl (meth)acrylate, ethyl carbitol (meth)acrylate, phosphate (meth)acrylate, ethylene oxide-modified phosphate (meth)acrylate, phenoxy (meth)acrylate, ethylene oxide-modified phenoxy (meth)acrylate, propylene oxide-modified phenoxy (meth)acrylate, nonyl phenol (meth)acrylate, ethylene oxide-modified nonyl phenol (meth)acrylate, propylene oxide-modified nonyl phenol (meth)acrylate, methoxy diethylene glycol (meth)acrylate, methoxy polyethylene glycol (meth)acrylate, methoxy propylene glycol (meth)acrylate, 2-(meth)acryloyloxyethyl-2-hydroxypropyl phthalate, 2-hydroxy-3-phenoxypropyl (meth)acrylate, 2-(meth)acryloyloxyethyl hydrogen phthalate, 2-(meth)acrtyloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, octafluoropropyl (meth)acrylate, and adamantane derivative mono (meth)acrylate such as adamantyl acrylate having a monovalent mono(meth)acrylate derived from 2-adamantane and adamantane diol.

Examples of difunctional (meth)acrylic monomers include di(meth)acrylates such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxy pivalate neopentyl glycol di(meth)acrylate.

Examples of trifunctional or higher functional (meth) acrylic monomers include tri(meth)acrylates such as trimethylolpropane tri(meth)acrylate, ethoxylated trimethylolpropane tri(meth)acrylate, propoxylated trimethylolpropane tri(meth)acrylate, tris 2-hydroxyethyl isocyanurate tri(meth)acrylate, and glycerin tri(meth)acrylate; trifunctional (meth)acrylate compounds such as pentaerythritol tri(meth)acrylate, dipentaerythritol tri(meth)acrylate, and ditrimethylolpropane tri(meth)acrylate; trifunctional or higher polyfunctional (meth)acrylate compounds such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate; and polyfunctional (meth)acrylate compounds in which a part of each of these (meth)acrylates is substituted with an alkyl group or s-caprolactone.

Preferable examples of monofunctional vinyl-based monomers include liquids that are incompatible with water at room temperature, such as vinyl ether-based monomers, vinyl ester-based monomers, and aromatic vinyl-based monomers; and particularly styrene and styrene-based monomers.

Examples of (meth)acrylates, among the monofunctional vinyl-based monomers, include methyl (meth)acrylate, ethyl (meth)acrylate, butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, isobornyl (meth)acrylate, glycidyl (meth)acrylate, tetrahydrofurfuryl (meth)acrylate, allyl (meth)acrylate, diethylaminoethyl (meth)acrylate, trifluoroethyl (meth)acrylate, heptafluorodecyl (meth)acrylate, dicyclopentenyl (meth)acrylate, dicyclopentenyloxyethyl (meth)acrylate, and tricyclodecanyl (meth)acrylate.

In addition, examples of monofunctional aromatic vinyl-based monomers include styrene, α-methylstyrene, o-methylstyrene, m-methylstyrene, p-methylstyrene, ethylstyrene, isopropenyltoluene, isobutyltoluene, tert-butylstyrene, vinylnaphthalene, vinylbiphenyl, and 1,1-diphenylethylene.

Examples of polyfunctional vinyl-based monomers include polyfunctional vinyl-based monomers having an unsaturated bond, such as divinylbenzene. A liquid that is incompatible with water at room temperature is preferable.

Specific examples of polyfunctional vinyl-based monomers include (1) divinyls, such as divinylbenzene, 1,2,4-trivinylbenzene, and 1,3,5-trivinylbenzene; (2) dimethacrylates such as ethylene glycol dimethacrylate, diethylene glycol dimethacrylate, triethylene glycol dimethacrylate, polyethylene glycol dimethacrylate, 1,3-propylene glycol dimethacrylate, 1,4-butylene glycol dimethacrylate, 1,6-hexamethylene glycol dimethacrylate, neopentyl glycol dimethacrylate, dipropylene glycol dimethacrylate, polypropylene glycol dimethacrylate, and 2,2-bis(4-methacryloxydiethoxyphenyl)propane; (3) trimethacrylates such as trimethylolpropane trimethacrylate and triethylolethane trimethacrylate; (4) diacrylates such as ethylene glycol diacrylate, diethylene glycol diacrylate, triethylene glycol diacrylate, polyethylene glycol diacrylate, 1,3-dipropylene glycol diacrylate, 1,4-dibutylene glycol diacrylate, 1,6-hexylene glycol diacrylate, neopentyl glycol diacrylate, dipropylene glycol diacrylate, polypropylene glycol diacrylate, 2,2-bis(4-acryloxypropoxyphenyl)propane, and 2,2-bis(4-acryloxydiethoxyphenyl)propane; (5) triacrylates such as trimethylolpropane triacrylate and triethylolethane triacrylate; (6) tetraacrylates such as tetramethylolmethane tetraacrylate; and (7) others such as tetramethylene bis(ethyl fumarate), hexamethylene bis(acrylamide), triallyl cyanurate, and triallyl isocyanurate.

Specific examples of functional styrene-based monomers include divinylbenzene, trivinylbenzene, divinyltoluene, divinylnaphthalene, divinylxylene, divinylbiphenyl, bis(vinylphenyl)methane, bis(vinylphenyl)ethane, bis(vinylphenyl)propane, and bis(vinylphenyl)butane.

In addition to these compounds, it is also possible to use a polyether resin, a polyester resin, a polyurethane resin, an epoxy resin, an alkyd resin, a spiroacetal resin, a polybutadiene resin, a polythiol polyene resin, or the like having at least one or more polymerizable functional groups. The material thereof is not particularly limited.

The above-mentioned polymerizable monomers may be used alone or a combination of two or more may be used.

The weight ratio of the dispersion liquid 4 of the fine fibers 1 and the polymerizable monomer that can be used in the second step is not particularly limited, but the polymerizable monomer is preferably in an amount of 1 part by mass or greater and 50 parts by mass or less with respect to 100 parts by mass of the micronized cellulose fibers. In a case where the amount of the polymerizable monomer is 1 part by mass or less, the yield of the composite particle 5 is lowered, which is not preferable. In a case where the amount of the polymerizable monomer is greater than 50 parts by mass, this makes it difficult to uniformly coat a polymerizable monomer liquid droplet 2A with the fine fiber 1, which is not preferable.

In addition, the polymerizable monomer may contain a polymerization initiator in advance. Examples of general polymerization initiators include radical initiators such as an organic peroxide and an azo polymerization initiator.

Examples of the organic peroxide include peroxyketal, hydroperoxide, dialkyl peroxide, diacyl peroxide, peroxycarbonate, and peroxyester.

Examples of the azo polymerization initiator include ADVN and AIBN.

Examples thereof include 2,2-azobis(isobutyronitrile) (AIBN), 2,2-azobis(2-methylbutyronitrile) (AMBN), 2,2-azobis(2,4-dimethylvaleronitrile) (ADVN), 1,1-azobis(1-cyclohexanecarbonitrile) (ACHN), dimethyl-2,2-azobisisobutyrate (MAIB), 4,4-azobis(4-cyanovaleric acid) (ACVA), 1,1-azobis(1-acetoxy-1-phenylethane), 2,2-azobis(2-methylbutyramide), 2,2-azobis(4-methoxy-2,4-dimethylvaleronitrile), 2,2-azobis(2-methylamidinopropane) dihydrochloride, 2,2-azobis[2-(2-imidazolin-2-yl)propane], 2,2-azobis[2-methyl-N-(2-hydroxyethyl)propionamide], 2,2-azobis(2,4,4-trimethylpentane), 2-cyano-2-propylazoformamide, 2,2-azobis(N-butyl-2-methylpropionamide), and 2,2-azobis(N-cyclohexyl-2-methylpropionamide).

In a case where a polymerizable monomer containing a polymerization initiator in advance is used in the second step, the polymerization initiator is contained in the polymerizable monomer liquid droplet inside the emulsion particle in a case where an O/W emulsion is formed; thus, the polymerization reaction is likely to proceed in a case where the monomer inside the emulsion is polymerized and solidified in a third step which will be described later.

The weight ratio of the polymerizable monomer and the polymerization initiator that can be used in the second step is not particularly limited; however, in general, the polymerization initiator is preferably in an amount of 0.1 parts by mass or more with respect to 100 parts by mass of the polymerizable monomer. In a case where the amount of the polymerization initiator is less than 0.1 parts by mass, the polymerization reaction does not proceed sufficiently and the yield of the composite particle 5 decreases, which is not preferable.

In addition, as shown in FIG. 3, as the liquid droplet 2 that can be used in the second step, it is also possible to use a dissolved polymer liquid droplet 2B in which an existing polymer is dissolved using various solvents. For example, it is preferable to stabilize the polymer liquid droplet as an O/W emulsion in the dispersion liquid 4 in such a manner that an existing polymer is dissolved in a solvent having low compatibility with the dispersion liquid 4 of the fine fibers 1 to prepare a dissolved liquid, and the dissolved liquid is added to the dispersion liquid 4 while being mechanically treated with an ultrasonic homogenizer or the like as described above.

Specific examples of the polymer include cellulose acetate derivatives such as cellulose acetate, cellulose acetate butyrate, and cellulose acetate propionate; polysaccharides such as chitin and chitosan; polylactic acids such as polylactic acid and copolymers of lactic acid with other hydroxycarboxylic acids; dibasic acid polyesters such as polybutylene succinate, polyethylene succinate, and polybutylene adipate; polycaprolactones such as polycaprolactone and copolymers of caprolactone with hydroxycarboxylic acid; polyhydroxybutyrates such as polyhydroxybutyrate and copolymers of polyhydroxybutyrate with hydroxycarboxylic acid; aliphatic polyesters such as polyhydroxybutyric acid and copolymers of polyhydroxybutyric acid with other hydroxycarboxylic acids; polyamino acids; polyester polycarbonates; and natural resins such as rosin. These polymer compounds may be used alone or a combination of two or more may be used.

The polymer is not particularly limited, but is preferably a biodegradable polymer. The term "biodegradable" as used herein refers to a polymer that is degraded and disappears in the global environment, such as in soil or seawater, or/and a polymer that is degraded and disappears in the living body. Generally, a polymer is degraded in soil or seawater by an enzyme possessed by a microorganism, whereas a polymer is degraded in the living body by physicochemical hydrolysis without the need to use an enzyme.

The degradation of a polymer means that the polymer becomes low molecular weight or water soluble and loses its morphology. The degradation of a polymer is not particularly limited, but occurs by hydrolysis of a main chain, a side chain, or a cross-linking point, or oxidative degradation of a main chain.

The biodegradable polymer is, for example, a naturally occurring natural polymer or a synthetic polymer.

Examples of the natural polymer include polysaccharides produced by plants (such as cellulose, starch, and alginic acid), polysaccharides produced by animals (such as chitin, chitosan, and hyaluronic acid), proteins (such as collagen, gelatin, and albumin), polyesters produced by microorganisms (such as poly(3-hydroxyalkanoate)), and polysaccharides (such as hyaluronic acid).

Examples of the synthetic polymer include an aliphatic polyester, a polyol, and a polycarbonate.

Examples of the aliphatic polyester include glycol/dicarboxylic acid-polycondensed polyesters (such as polyethylene succinate and polybutylene succinate), polylactides (such as polyglycolic acid and polylactic acid), polylactones (such as β-caprolactone and ε-caprolactone), and others (such as polybutylene terephthalate and adipate).

Examples of the polyol include polyvinyl alcohols.

Examples of the polycarbonate include polyester carbonates.

Example of other biodegradable polymers include biodegradable synthetic polymers such as polyacid anhydride, polycyanoacrylate, polyorthoester, and polyphosphazene.

In addition, a solvent having low compatibility with the dispersion liquid 4 of the fine fibers 1 is preferable as the solvent for dissolving the polymer. In a case where a solvent is highly soluble in water, the solvent is easily dissolved from a dissolved polymer liquid droplet layer into an aqueous phase, which makes emulsification difficult. On the other hand, in a case of a solvent that is not soluble in water, the solvent cannot move from a dissolved polymer liquid droplet phase to a dispersion liquid phase of the fine fibers 1, and therefore a composite particle cannot be obtained. In addition, the solvent preferably has a boiling point of 90° C. or lower.

In a case where the boiling point is higher than 90° C., the dispersion liquid 4 of the fine fibers 1 evaporates before the solvent evaporates, and therefore a composite particle cannot be obtained. Specific examples of the solvent that can be used include dichloromethane, chloroform, 1,2-dichloroethane, and benzene.

Further, as shown in FIG. 4, in the second step, it is also possible to use a molten polymer liquid droplet 2C in which a polymer itself is melted without using a solvent. For example, it is preferable to stabilize the polymer liquid droplet as an O/W emulsion in the dispersion liquid 4 in such a manner that a solid polymer is melted at room temperature to prepare a liquid, and the melt is added to the dispersion liquid 4 heated to a temperature at which the molten state of the polymer can be maintained, while being mechanically treated with an ultrasonic homogenizer or the like as described above.

The molten polymer liquid droplet 2C that can be used in the second step preferably has low solubility in a micronized cellulose aqueous dispersion liquid. In a case where the solubility in water is high, the polymer is easily dissolved from a molten polymer liquid droplet layer into an aqueous phase, which makes emulsification difficult. In addition, the molten polymer preferably has a melting point of 90° C. or lower. In a case where the melting point is higher than 90° C., the water in the micronized cellulose dispersion liquid evaporates, which makes emulsification difficult. Specifically, for example, it is possible to use pentaerythritol tetrastearate, pentaerythritol distearate, pentaerythritol tristearate, stearyl stearate, batyl stearate, stearyl stearate, myristyl myristate, cetyl palmitate, ethylene glycol distearate, behenyl alcohol, microcrystalline wax, paraffin wax, hydrocarbon wax, fatty acid alkyl ester, polyol fatty acid ester, a mixture of fatty acid ester and wax, a mixture of fatty acid esters, glycerin monopalmitate (/stearic acid monoglyceride), glycerin mono/distearate (/glycerin stearate), glycerin monoacetomonostearate (/glycerin fatty acid ester), succinic acid aliphatic monoglyceride (/glycerin fatty acid ester), citric acid saturated aliphatic monoglyceride, sorbitan monostearate, sorbitan fatty acid ester, sorbitan tribehenate, propylene glycol monobehenate (/propylene glycol fatty acid ester), stearate of pentaerythritol adipate polymer, pentaerythritol tetrastearate, dipentaerythritol hexastearate, stearyl citrate, pentaerythritol fatty acid ester, glycerin fatty acid ester, ultra-light color rosin, rosin-containing diol, ultra-light color rosin metal salt, hydrogenated petroleum resin, rosin ester, hydrogenated rosin ester, special rosin ester, novolac, crystalline poly α-olefin, polyalkylene glycol, polyalkylene glycol ester, polyoxyalkylene ether; polylactic acids such as polylactic acid and copolymers of lactic acid with other hydroxycarboxylic acids; dibasic acid polyesters such as polybutylene succinate, polyethylene succinate, and polybutylene adipate; polycaprolactones such as polycaprolactone and copolymers of caprolactone with hydroxycarboxylic acid; polyhydroxybutyrates such as polyhydroxybutyrate and copolymers of polyhydroxybutyrate with hydroxycarboxylic acid; aliphatic polyesters such as polyhydroxybutyric acid and copolymers of polyhydroxybutyric acid with other hydroxycarboxylic acids; polyamino acids; polyester polycarbonates; and natural resins such as rosin.

In addition, the polymerizable monomer liquid droplet and/or polymer liquid droplet 2 may contain a functional component other than the polymerization initiator in advance. Specific examples thereof include a magnetic substance, a pharmaceutical product, an agricultural chemical, a fragrance, an adhesive, an enzyme, a pigment, a dye, a deodorant, a metal, a metal oxide, and an inorganic oxide. In a case where the polymerizable monomer contains a functional component other than the polymerization initiator in advance, the above-mentioned functional component can be contained inside the particle in a case the particle is formed as the composite particle 5, depending on the application; and the functions can be exhibited according to the intended use.

Further, the liquid droplet 2 can also be formed and emulsified by using the polymerizable monomer and the dissolved/molten polymer in combination. In addition, in a case where a biodegradable resin is selected as the polymer species that is a core of the present composite particle, the obtained composite particle 5 is composed of a biodegradable resin of an inner core and a nanofiber of an outer shell, and therefore it is also possible to provide the composite particle 5 as a highly environmentally friendly composite particle having a biodegradable material.

(Third Step)

The third step is a step of solidifying the polymerizable monomer liquid droplet and/or polymer liquid droplet 2 to obtain the composite particle 5 in which the core particle 3 is coated with the fine fiber 1.

The method for solidifying the polymerizable monomer liquid droplets is not particularly limited and can be appropriately selected depending on the type of the polymerizable monomer used and the type of the polymerization initiator used. For example, there is a suspension polymerization method.

The specific method of suspension polymerization is not particularly limited, and the suspension polymerization can be carried out using a known method. For example, the suspension polymerization can be carried out by heating while stirring the O/W emulsion prepared in the second step, in which the monomer liquid droplet containing the polymerization initiator is coated and stabilized with the fine fiber 1. The method of stirring is not particularly limited, and a known method can be used. Specifically, a disperser or a stirrer can be used. Alternatively, only the heat treatment may be carried out without stirring. In addition, the temperature condition at the time of heating can be appropriately set depending on the type of the polymerizable monomer and the type of the polymerization initiator, but the heat treatment temperature is preferably 20° C. or higher and 150° C. or lower. In a case where the heat treatment temperature is lower than 20° C., the reaction rate of polymerization is lowered, which is not preferable. In a case where the heat treatment temperature is higher than 150° C., fine fiber 1 may be denatured, which is not preferable. The time for the polymerization reaction can be appropriately set depending on the type of the polymerizable monomer and the type of the polymerization initiator, but is usually about 1 hour to 24 hours. In addition, the polymerization reaction may be carried out by irradiation treatment with ultraviolet rays, which is a kind of electromagnetic waves. In addition to electromagnetic waves, particle beams, such as electron beams, may also be used.

In addition, the method for solidifying the polymer liquid droplet is not particularly limited. For example, in a case where the dissolved polymer liquid droplet 2B using a solvent is used, after the formation of an O/W emulsion in the dispersion liquid 4 of the fine fibers 1, the solvent having low solubility in water diffuses into the aqueous phase over time, as described above, so that the dissolved polymer can be deposited and solidified as particles. In addition, for example, in a case where the molten polymer liquid droplet 2C liquefied by heating the polymer is used, the molten polymer liquid droplet 2C can be solidified as particles by forming an O/W emulsion in the dispersion liquid 4 of the fine fibers 1 and then cooling the emulsion.

Through the foregoing steps, it is possible to prepare a spherical composite particle 5 in which the core particle 3 is coated with the fine fiber 1.

Immediately after the completion of the solidification treatment of the liquid droplet 2, a large amount of water and free fine fibers 1 that do not contribute to the formation of the fine fiber layer 10 of the composite particles 5 are mixed in the dispersion liquid of the composite particles 5. Therefore, it is necessary to recover and purify the prepared composite particles 5, and washing by centrifugation or washing by filtration is preferable as the recovery and purification method. A known method can be used as the washing method by centrifugation. Specifically, the composite particles 5 are precipitated by centrifugation to remove the supernatant, and redispersed in a water/methanol mixed solvent; this operation is repeated. Finally, the residual solvent is removed from the precipitate obtained by centrifugation, whereby the composite particles 5 can be recovered. A known method can also be used for washing by filtration. For example, suction filtration with water and methanol is repeated using a PTFE membrane filter having a pore size of 0.1 μm. Finally, the residual solvent is further removed from the paste remaining on the membrane filter, whereby the composite particles 5 can be recovered.

The average particle size of the composite particle 5 obtained through the third step is preferably 0.05 μm or greater and 1000 μm or less. The particle size of the composite particle 5 reflects a liquid droplet size of an emulsion liquid droplet obtained in the second step. The liquid droplet size of the emulsion liquid droplet is determined by the preparation method and preparation conditions for preparing an O/W emulsion, the type of the polymerizable monomer or polymer forming the core particle 3, the type of the fine fiber 1, or a combination thereof.

The composite particle 5 obtained by the above-mentioned production method is obtained as a dispersion liquid. The composite particle 5 is obtained as a dry solid material by further removing the solvent. The method for removing a solvent is not particularly limited. For example, excess water is removed by a centrifugation method or a filtration method, followed by heat-drying in an oven, whereby the composite particle 5 can be obtained as a dry solid material. The thus-obtained dry solid material does not form a film or aggregate, and is obtained as a fine powder. Although the reason for this is not clear, it is generally known that, in a case where the solvent is removed from the dispersion liquid of micronized cellulose, the fine fibers 1 firmly aggregate with each other and form a film. On the other hand, in a case of the dispersion liquid containing the composite particles 5, it is considered that the composite particle 5 is a spherical composite particle in which the fine fibers 1 are immobilized on the surface; and therefore, even in a case where the solvent is removed, the fine fibers 1 do not aggregate with each other and only come into contact with each other at points between the composite particles, whereby the dry solid material can be obtained as a fine powder. The composite particle of the present invention can be used as a fine powder, as described above and is therefore suitable for cosmetic applications and medical applications, such as powder-type foundation compositions. In addition, since the composite particles 5 do not aggregate with each other, it is also easy to redisperse the composite particles 5 obtained as a dry powder in a solvent again, and the dispersion stability derived from the fine fibers 1 bonded to the surface of the composite particles 5 is exhibited even after the redispersion. At this time, in a case where an anionic functional group is introduced into the crystal surface of the fine fiber 1 to be used, the anionic functional group is selectively arranged on the surface of the composite particle, thus making it easier for a solvent to infiltrate between the composite particles due to an osmotic effect, and therefore the dispersion stability is further improved, which is preferable.

The dry powder of the composite particles 5 is a dry solid material that contains almost no solvent and can be redispersed in a solvent. Specifically, the solid content percentage can be set to 80% or more, further 90% or more, and still further 95% or more. Since the solvent can be almost removed, preferable effects can be obtained from the viewpoint of reduction of transportation cost, prevention of putrefaction, and improvement of addition rate. In a case where the solid content percentage is made to 80% or more by a drying treatment, the fine fibers 1 easily absorb moisture, and therefore there is a possibility that the solid content percentage may decrease over time by adsorbing moisture in the air. However, considering the technical idea of the present invention, which is characterized in that the composite particles 5 can be easily obtained as a dry powder and can be redispersed, any dry solid material including a step of setting the solid content percentage of the dry powder containing the composite particles 5 to 80% or more is defined as being included in the technical scope of the present invention.

(Fourth Step)

The fourth step is a step of adsorbing a compound (for example, a drug) that forms an ionic bond in a pair with an ionic functional group of the fine fiber 1 onto the fine fiber 1 in the surface of the composite particle 5. In the present embodiment, a drug is adsorbed onto the fine fiber 1. A drug aqueous solution can be mixed with the dispersion liquid of the composite particles 5 obtained after the third step. Alternatively, the drug can be adsorbed onto the fine fiber 1 in such a manner that the composite particles 5 obtained after the third step are supported on a base material or the like, and the drug aqueous solution is brought into contact with the composite particles.

The drug to be used is preferably a compound that forms an ionic bond with an ionic functional group of the fine fiber 1, which is preferably a substance that is ionized in an aqueous solution. Examples of a drug capable of having such a structure include a triarylmethane-based dye, a methine-based dye, a cyanine-based dye, an azo-based dye, a diarylmethane-based dye, a quinoneimine-based dye, a quinoline-based dye, an anthraquinone-based dye, a nitro-based dye, a phthalocyanine-based dye, a dipyrromethene-based dye, and a xanthene-based dye. Examples of the drug used in pharmaceutical products and the like include compounds having a structure such as fatty acid, saturated fatty acid, fatty acid salt, fatty acid ester, phospholipid, acetate, betaine, glycinate, imidazoline, or propionate. The aqueous solution is not limited as long as it does not cause alteration of the compound. In addition to water, for example, alcohols, ethers, esters, ketones, or hydrocarbons may be used, two or more substances of which may be used as a mixture.

In a case where the fine fiber 1 is anionic, the composite particle 5 has an increase in ionicity of the fine fiber 1 by increasing the pH, and therefore easily adsorbs a compound that forms an ionic bond. The pH range is preferably adjusted within a range that does not cause alteration of the composite particles 5 and the compound, and the adsorption and release are preferably controlled in a range of pH 1 to pH 7. In a case of adsorbing the compound, the pH is set to preferably 4 or higher and more preferably 5 or higher. Alternatively, in a case where the fine fiber 1 is cationic, the composite particle 5 has an increase in ionicity of the fine fiber 1 by lowering the pH, and therefore easily adsorbs a compound that forms an ionic bond. In this case, as for the pH range, it is preferable to control adsorption and release in a range of pH 1 to pH 7. In a case of adsorbing the compound, the pH is set to preferably 4 or lower and more preferably 3 or lower.

The pH responsiveness, adsorption/desorption behavior, and repetitive characteristics evaluated using the prepared composite particle 5 will be described with reference to FIG. 5 to FIG. 8B. Here, the amount of ionic functional groups of the composite particle 5 used is 0.028 mmol/g. As a comparative sample composite particle 5-0, the composite particle 5 was treated with concentrated sulfuric acid. The amount of ionic functional groups on the surface was less than 0.0002 mmol/g, which was below the detection limit.

Figure 5:
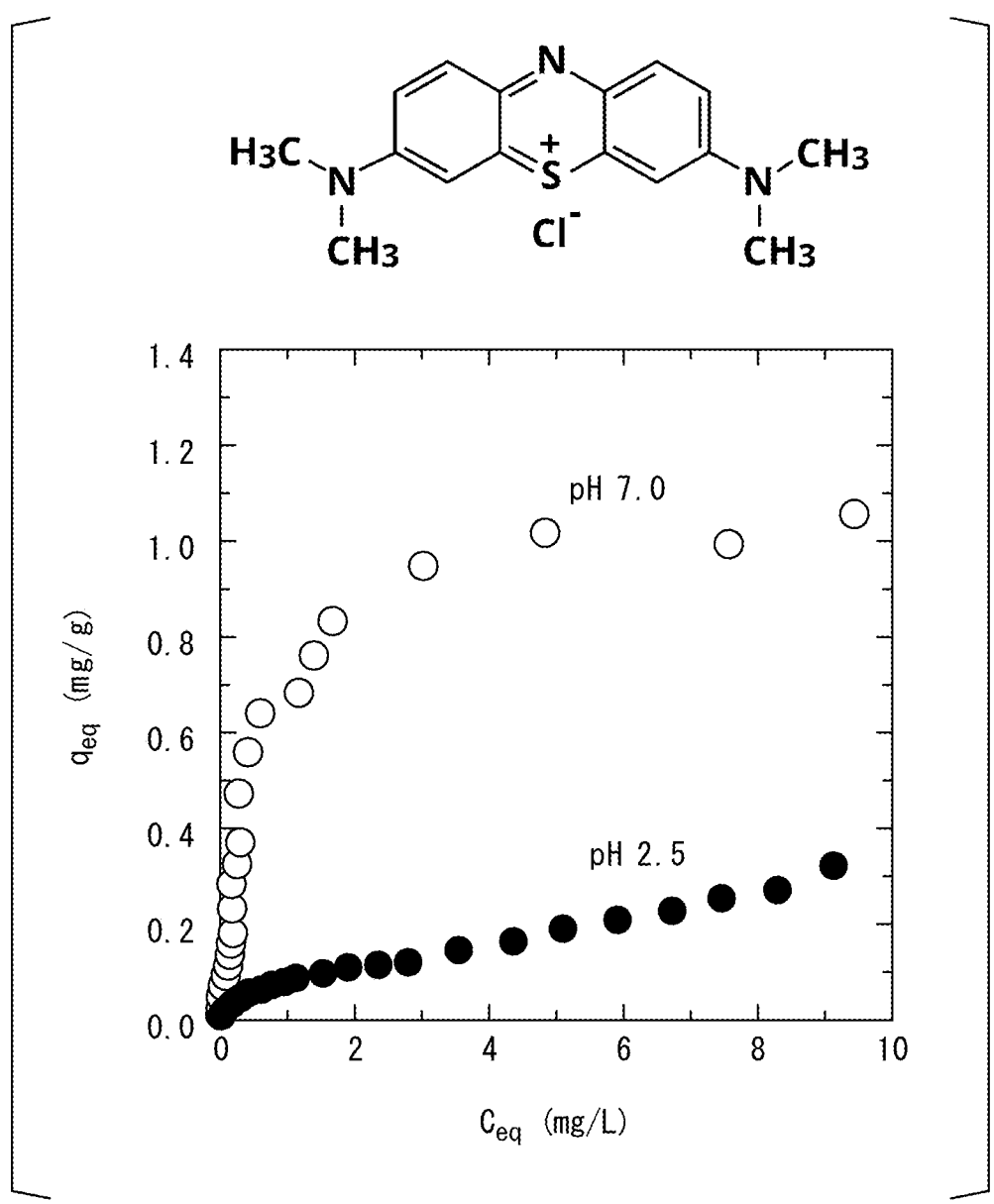
FIG. 5 is a view showing a chemical structure of methylene blue and a graph showing an amount of adsorption in a case where methylene blue is adsorbed onto a composite particle.

FIG. 5 is a graph showing an amount of adsorption in a case where methylene blue is adsorbed onto the composite particle 5 made of micronized cellulose in which the fine fiber 1 has anionic properties. The horizontal axis shows an equilibrium concentration (a concentration of drug in an aqueous solution in a case where the composite particles 5 are added and the absorption and desorption of the drug are in equilibrium). The amount of adsorption was measured by preparing drug aqueous solutions having different equilibrium concentrations in a buffer solution in advance, mixing the composite particles 5 therewith, and then measuring absorbances of the aqueous solutions to obtain a difference between the measured absorbances. As shown in FIG. 5, the amount of adsorption of methylene blue is larger in a case where the pH of the aqueous solution is 7.0 than in a case where the pH of the aqueous solution is 2.5. The adsorption of methylene blue onto the fine fibers 1 is pH-dependent, and therefore methylene blue is more likely to be adsorbed onto the fine fibers 1 in a case where the pH of the aqueous solution is 7.0. Similarly, in a case where methylene blue was adsorbed onto the composite particles 5-0 as a comparative sample, the adsorption thereof was independent of the concentration of drug in the aqueous solution, and the amount of adsorption of methylene blue was 0.01 mg/g or less.

Figure 6:
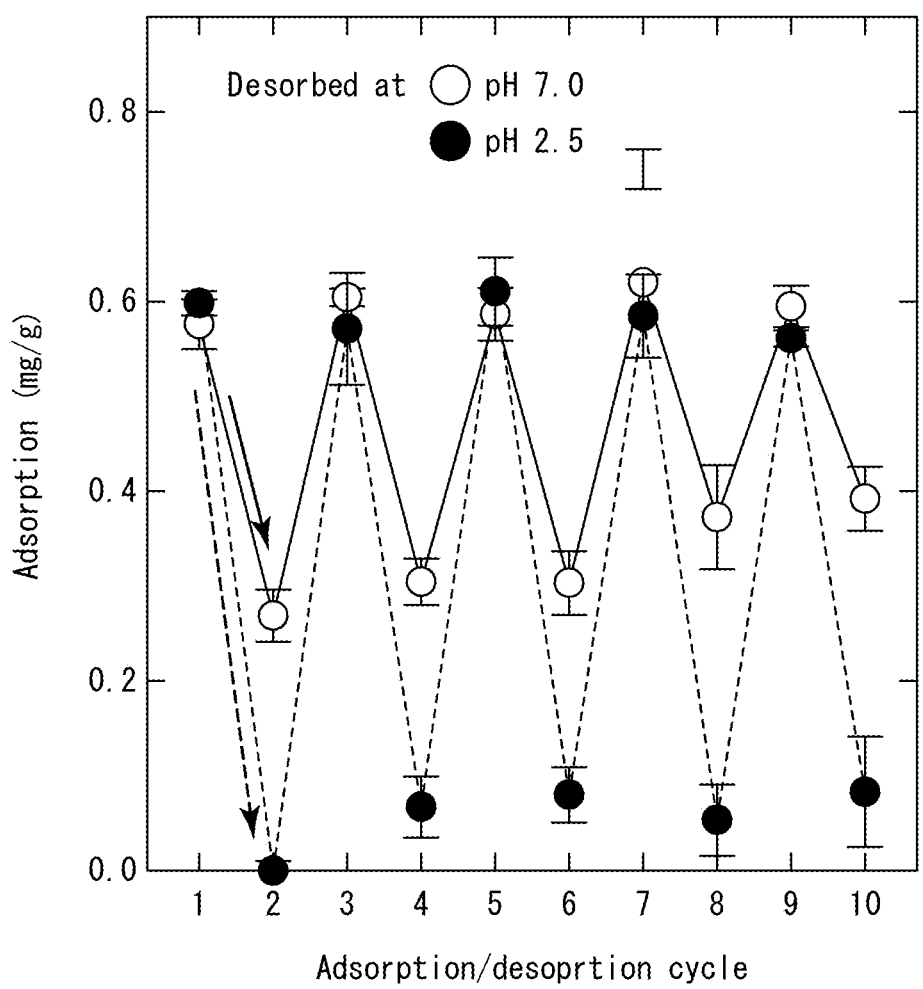
FIG. 6 is a graph showing the repeatability of the adsorption/desorption behavior of methylene blue onto a composite particle in buffer solutions having different pH.

FIG. 6 is a graph showing an amount of adsorption in a case where a series of adsorption/desorption steps such as adsorbing methylene blue onto the composite particles 5 and desorbing the methylene blue with buffer solutions having different pH are repeatedly carried out. After adsorbing methylene blue at pH 7.0 (cycle 1), a step of thoroughly washing the composite particles 5 with a buffer solution of pH 7.0 or pH 2.5 (cycle 2) and adsorbing the methylene blue at pH 7.0 again was carried out for 10 cycles. The pH-dependent desorption behavior was shown. Furthermore, good reproducibility of this adsorption/desorption behavior was confirmed. This indicates that the fine fibers 1 do not fall off from the composite particles 5 even after repeated washing and are physically stable. Similarly, methylene blue was treated on the composite particles 5-0 as a comparative sample, but there was no pH dependence and the amount of adsorption thereof was 0.01 mg/g or less.

Figure 7A:
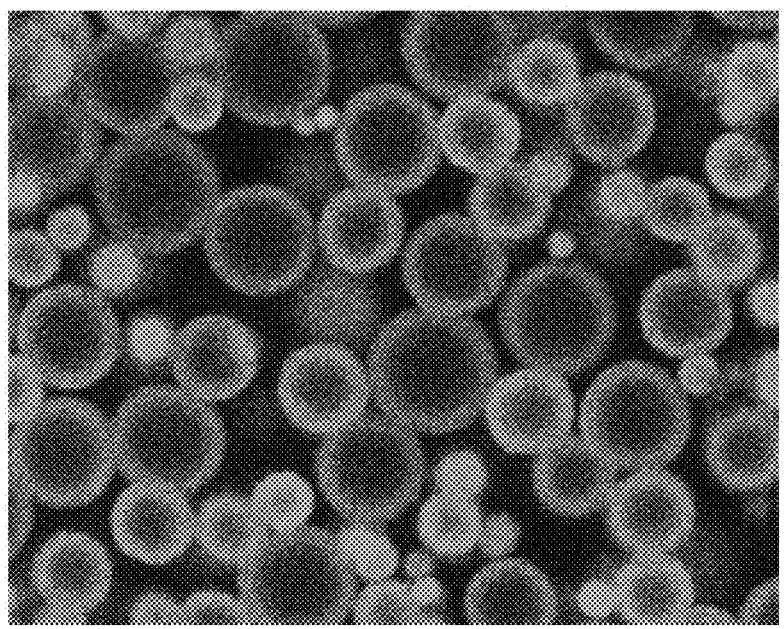
FIG. 7A is an image of acridine orange adsorbed onto a composite particle observed with a confocal laser scanning microscope.
Figure 7B:
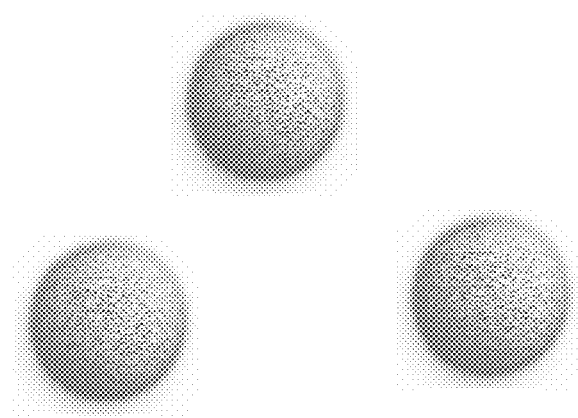
FIG. 7B is an enlarged image of the composite particle shown in FIG. 7A.

FIG. 7A is an image of acridine orange adsorbed onto the composite particle 5 observed with a confocal laser scanning microscope. FIG. 7B is an enlarged image of the composite particle 5 of FIG. 7A. It was observed that the molecule was adsorbed only onto the composite particle 5.

The supported drug amount varies depending on the amount of the ionic functional group of the composite particle 5, the particle size of the composite particle 5, and the like. For example, a larger charge amount of the ionic functional group of the composite particle 5 leads to a larger supported drug amount. In addition, a smaller particle size of the composite particles 5 leads to an increased specific surface area of the composite particles per unit volume, which in turn leads to an increase in supported drug amount.

The adsorption of the drug onto the fine fibers 1 is generated not only by the above-mentioned ionic bond but also by the van der Waals force. The drug is adsorbed onto the surface of the fine fibers 1 by the van der Waals force acting between the fine fibers 1. The drug adsorbed onto the composite particles 5 by the van der Waals force is pH-independent and can be washed away with a solvent or the like that is easily compatible with the drug, if necessary.

(Drug Release)

The composite particles 5 in which the drug is adsorbed onto the surface thereof are exposed to a buffer solution (0.1 M) having a pH different from the pH adjusted in the third step. The buffer solution is, for example, an acetate buffer solution, a phosphate buffer solution, a citrate buffer solution, a phosphate-citrate buffer solution, or a formate buffer solution. Since the adsorption of the drug onto the fine fibers 1 is pH-dependent, the adsorbed drug is released from the composite particles 5 depending on the adjusted pH.

Figure 8A:
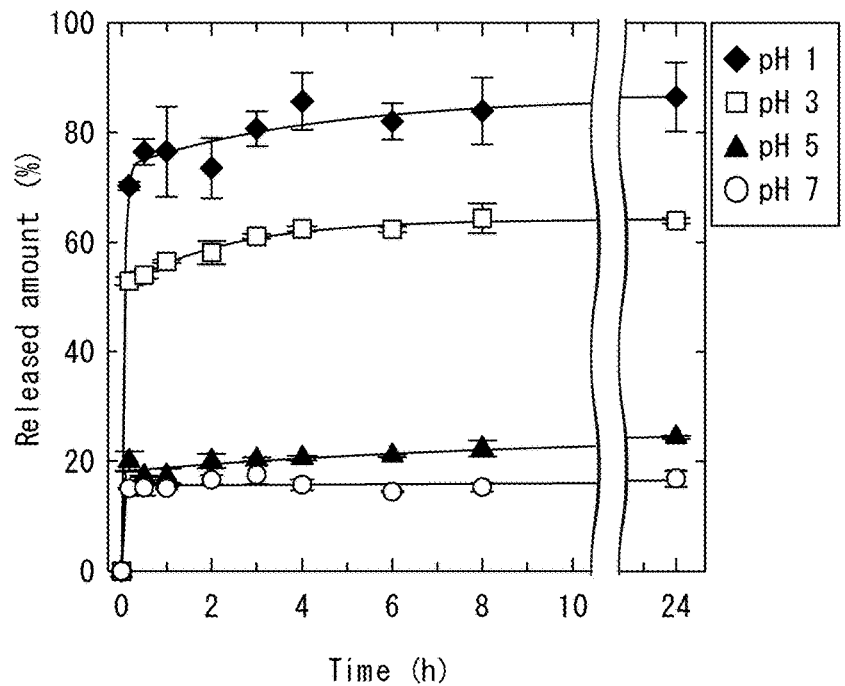
FIG. 8A is a graph showing the difference in the amount of drug released due to the difference in pH and is a graph showing an amount of ranitidine released.
Figure 8B:
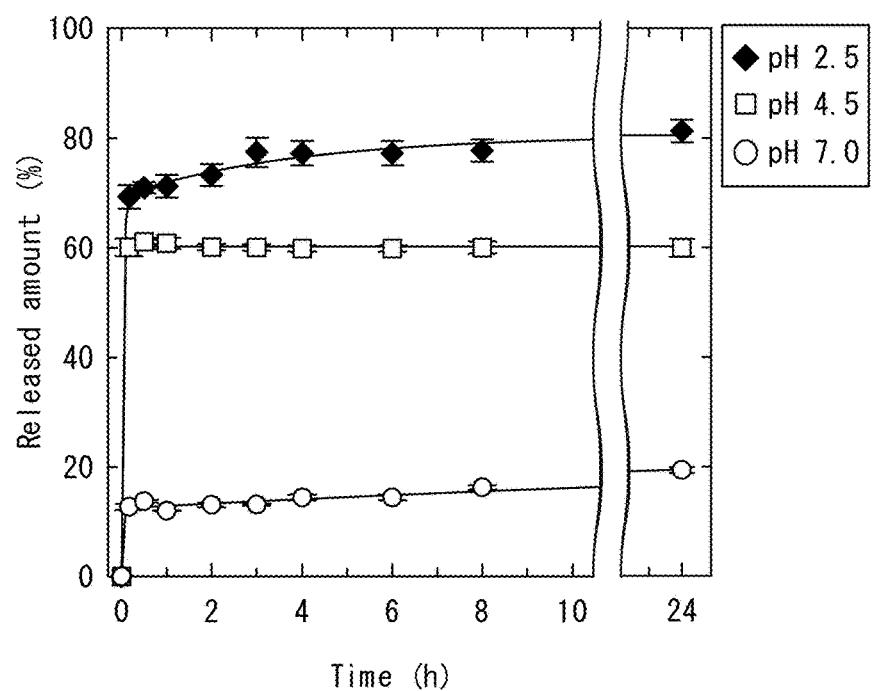
FIG. 8B is a graph showing the difference in the amount of drug released due to the difference in pH and is a graph showing an amount of mitomycin C released.

FIG. 8A and FIG. 8B are graphs showing the difference in the amount of drug released due to the difference in pH. FIG. 8A is a graph showing an amount of ranitidine released. FIG. 8B is a graph showing an amount of mitomycin C released. Different drug release behaviors were observed depending on the pH environment.

The composite particle 5 onto which the drug is adsorbed can be used for the purpose of selectively releasing a drug under acidic conditions such as, for example, the stomach by utilizing different drug release behaviors depending on the pH environment. In addition, it can be expected to be used for pH-dependent drug delivery.

The composite particle 5 according to the present embodiment is a novel composite particle derived from the fine fibers 1 on the surface of the composite particle 5 and having high biocompatibility and good dispersion stability without aggregation even in a solvent.

In addition, since the dry solid material containing the composite particles 5 according to the present embodiment is obtained as a fine powder and the particles do not aggregate with each other, it is also easy to redisperse the composite particles 5 obtained as a dry powder in a solvent again, and the dispersion stability derived from the coating layer of CNF1 bonded to the surface of the composite particles 5 is exhibited even after the redispersion.

In addition, since the dry solid material containing the composite particles 5 according to the present embodiment is obtained as a fine powder and the particles do not aggregate with each other, it is also easy to redisperse the composite particles 5 obtained as a dry powder in a solvent again, and a compound such as a drug adsorbed onto the fine fibers 1 can be released into the solvent by adjusting the pH of the solvent.

Although the first embodiment of the present invention has been described in detail with reference to the accompanying drawings, the specific configuration is not limited to this embodiment and includes design changes and the like within a scope that does not depart from the scope of the present invention as claimed. In addition, the constituent elements shown in the above-described first embodiment and modified examples can be appropriately combined and configured.

Second Embodiment

A second embodiment of the present invention will be described. In the following description, the components common to those already explained are given the same reference signs, and duplicate descriptions are omitted. The present embodiment is different from the first embodiment in that the fine fiber is a micronized chitin.

In the present embodiment, the fine fiber 1 is a chitin nanofiber (micronized chitin), which is a nanofiber obtained by crushing chitin/chitosan collected from a crab shell or the like into ultrafine fibers. The fine fiber 1 has biodegradability.

The fine fiber 1 is not particularly limited, but preferably contains an ionic functional group. It is preferable that the ionic functional group of the fine fiber 1 is cationic. The ionic functional group content of the fine fibers 1 constituting the fine fiber layer 10 is preferably 0.1 mmol/g or greater and 3.0 mmol/g or less with respect to the dry weight of the fine fibers 1 constituting the fine fiber layer 10. In a case where the ionic functional group content of the fine fiber 1 is in this range, composite particles 5 having a uniform particle size and high dispersibility can be obtained.

In addition, the ionic functional group content of the fine fibers 1 constituting the fine fiber layer 10 is preferably 0.0002 mmol/g or greater and 0.2 mmol/g or less with respect to the dry weight of the composite particles 5.

Further, the fine fiber 1 preferably has a fiber shape derived from a microfibril structure.

Specifically, it is preferable that the fine fiber 1 is fibrous, has a number average minor axis diameter of 1 nm or longer and 1000 nm or shorter, and a number average major axis diameter of 50 nm or longer; and that the number average major axis diameter is 5 or more times longer than the number average minor axis diameter. The crystallinity of the fine fiber 1 is preferably 50% or more.

The number average minor axis diameter of the fine fibers 1 is obtained as an average value of the minor axis diameters (minimum diameters) of 100 fibers measured by observation with a transmission electron microscope or observation with an atomic force microscope. On the other hand, the number average major axis diameter of the fine fibers 1 is obtained as an average value of the major axis diameters (maximum diameters) of 100 fibers measured by observation with a transmission electron microscope or observation with an atomic force microscope.

In particular, the fine fiber 1 preferably consists of alpha chitin having a degree of N-acetylation of 60% or greater and 85% or less. In a case where the degree of N-acetylation is in this range, it is possible to obtain narrow nanofibers having a number average minor axis diameter of 5 nm or longer and 50 nm or shorter and a number average major axis diameter of 300 nm or longer and 5 μm or shorter and separated into individual pieces.

The polymer is not particularly limited, and examples thereof include an acrylic polymer, an epoxy-based polymer, a polyester-based polymer, an amino-based polymer, a silicone-based polymer, a fluorine-based polymer, and a urethane/isocyanate-based polymer.

The polymer is not particularly limited, but is preferably a biodegradable polymer. The term "biodegradable" as used herein refers to a polymer that is degraded and disappears in the global environment, such as in soil or seawater, or/and a polymer that is degraded and disappears in the living body. Generally, a polymer is degraded in soil or seawater by an enzyme possessed by a microorganism, whereas a polymer is degraded in the living body by physicochemical hydrolysis without the need to use an enzyme.

The biodegradable polymer is, for example, a naturally occurring natural polymer or a synthetic polymer. Examples of the natural polymer include polysaccharides produced by plants (such as cellulose, starch, and alginic acid), polysaccharides produced by animals (such as chitin, chitosan, and hyaluronic acid), proteins (such as collagen, gelatin, and albumin), polyesters produced by microorganisms (such as poly(3-hydroxyalkanoate)), and polysaccharides (such as hyaluronic acid). The biodegradable polymer will be described later.

<Method for Producing Composite Particle 5>

Next, a method for producing the composite particle 5 according to the present embodiment will be described. The method for producing the composite particle 5 according to the present embodiment is a method for producing the composite particle 5 including a step of defibrating a chitin and/or chitosan raw material in a solvent to obtain a dispersion liquid of fine fibers 1 (step 1B); a step of coating the surface of the polymerizable monomer liquid droplet and/or polymer liquid droplet 2 with the fine fiber 1 in the dispersion liquid of the fine fibers 1 to stabilize the liquid droplet as an emulsion (second step); a step of solidifying the liquid droplet 2 to obtain the composite particle 5 in which the core particle 3 is coated with the fine fiber 1 (third step); and a step of adsorbing a compound that forms an ionic bond in a pair with an ionic functional group of the fine fiber 1 onto the fine fiber 1 in the surface of the composite particle 5 (fourth step).

The composite particle 5 obtained by the above-mentioned production method is obtained as a dispersion. The composite particle 5 is obtained as a dry solid material by further removing the solvent. The method for removing a solvent is not particularly limited. For example, excess water is removed by a centrifugation method or a filtration method, followed by heat-drying in an oven, whereby the composite particle 5 can be obtained as a dry solid material. The thus-obtained dry solid material does not form a film or aggregate, and is obtained as a fine powder. Although the reason for this is not clear, it is generally known that, in a case where the solvent is removed from the dispersion of the fine fibers 1, the fine fibers 1 firmly aggregate with each other and form a film. On the other hand, in a case of the dispersion liquid containing the composite particles 5, it is considered that the composite particle 5 is a spherical composite particle in which the fine fibers 1 are immobilized on the surface; and therefore, even in a case where the solvent is removed, the fine fibers 1 do not aggregate with each other and only come into contact with each other at points between the composite particles, whereby the dry solid material can be obtained as a fine powder. The composite particle of the present invention can use micronized chitin having biodegradability and biocompatibility as a fine powder, as described above and is therefore suitable for cosmetic applications and medical applications, such as powder-type foundation compositions.

In addition, since the composite particles 5 do not aggregate with each other, it is also easy to redisperse the composite particles 5 obtained as a dry powder in a solvent again, and the dispersion stability derived from the fine fibers 1 bonded to the surface of the composite particles 5 is exhibited even after the redispersion. At this time, in a case where an ionic functional group is introduced into the crystal surface of the fine fiber 1 to be used, the ionic functional group is selectively arranged on the surface of the composite particle, thus making it easier for a solvent to infiltrate between the composite particles due to an osmotic effect, and therefore the dispersion stability is further improved, which is preferable.

The dry powder of the composite particles 5 is a dry solid material that contains almost no solvent and can be redispersed in a solvent. Specifically, the solid content percentage can be set to 80% or more, further 90% or more, and still further 95% or more. Since the solvent can be almost removed, preferable effects can be obtained from the viewpoint of reduction of transportation cost, prevention of putrefaction, and improvement of addition rate. In a case where the solid content percentage is made to 80% or more by a drying treatment, the fine fibers 1 easily absorb moisture, and therefore there is a possibility that the solid content percentage may decrease over time by adsorbing moisture in the air. However, considering the technical idea of the present invention, which is characterized in that the composite particles 5 can be easily obtained as a dry powder and can be redispersed, any dry solid material including a step of setting the solid content percentage of the dry powder containing the composite particles 5 to 80% or more is defined as being included in the technical scope of the present invention.

Individual steps will be described in detail below.

(Step 1B)

The step 1B is a step of defibrating a chitin and/or chitosan raw material in a solvent to obtain a dispersion liquid of the fine fibers 1. Although not particularly limited, a dispersion liquid containing chitin nanofibers separated into individual pieces can be obtained by using the following method. Composite particles 5 having good dispersibility and uniform particle size can be obtained by using such chitin nanofibers.

Specifically, a dispersion liquid of fine fibers 1 was prepared by the steps of (1) purification of a chitin and/or chitosan raw material and introduction of an ionic functional group, (2) an immersion treatment, and (3) a defibration treatment.

(1) Purification of Chitin and/or Chitosan Raw Material and Introduction of Ionic Functional Group First, a chitin and/or chitosan raw material is prepared. For example, alpha chitin having a structure of an antiparallel chain found in crustaceans such as crabs and shrimp, and beta chitin having a structure of a parallel chain found in squid cuttlebone or the like can be used.

Chitin and/or chitosan is a polysaccharide whose molecular structure resembles cellulose. A hydroxyl group is bonded to the carbon at the 2-position of the pyranose ring in cellulose; an N-acetyl group is bonded to the carbon at the 2-position of the pyranose ring in chitin; and an amino group is bonded to the carbon at the 2-position of the pyranose ring in chitosan, and the other parts have the same structure therebetween. Chitin and/or chitosan does not have a 100% N-acetyl group and a 100% amino group bonded to the C2 position of the pyranose ring, and generally contains a mixture of N-acetyl groups and amino groups.

The chitin and/or chitosan raw material is a linear structural polysaccharide that supports and protects an animal's body such as tendons of crabs, shrimp and other crustaceans, insects, spiders and other arthropods, and squids; and is crystalline (there is a part where the molecules are regularly arranged) and is partially bound to proteins. Chitin is a polysaccharide whose main constituent sugar is N-acetylglucosamine. In a case where a chitin and/or chitosan raw material is isolated and purified, there is almost no purified chitin consisting 100% of N-acetylglucosamine, and chitin and/or chitosan that partially contains glucosamine as a constituent is obtained.

For example, two types of a raw material a, which is a dried king crab shell crushed to about 5 mm, and a raw material b, which is a wet spear squid soft cuttlebone crushed to about 1 cm, can be used as chitin and/or chitosan raw materials.

The chitin and/or chitosan raw material can be purified by the following method. First, the chitin and/or chitosan raw material is degreased, then demineralized, deproteinized, bleached several times, and finally washed.

The chitin and/or chitosan raw material is immersed in a chloroform/methanol (2/1) solution for one day for degreasing.

Next, the degreased raw material is treated with 1M hydrochloric acid for 3 hours in order to carry out demineralization. The treated raw material is treated overnight with a nitrogen-purged 10% sodium hydroxide aqueous solution for deproteinization. Then, the treated raw material is immersed in a 0.3% sodium chlorite aqueous solution and bleached by stirring with a magnetic stirrer in an oil bath set at 70° C. for 4 hours.

After a series of demineralization, deproteinization, and bleaching treatments are repeated 4 times, the degreased raw material is washed with a 1M sodium hydroxide aqueous solution to deprotonate the amino groups on the surface, and then washed with water.

The ionic functional group to be introduced is not particularly limited, and a known method can be used for the introduction thereof. For example, an amino group or a carboxy group can be introduced. In particular, the method of introducing an amino group by a partial deacetylation treatment is safe and therefore suitable for use in cosmetic and medical applications.

The raw material a (alpha chitin), which is a dried king crab shell crushed to about 5 mm, is subjected to the above-mentioned purification treatment. After the above-mentioned purification treatment, the treated raw material a is preferably kept at 0° C. or higher and 140° C. or lower and more preferably 87° C. to 99° C., and is preferably immersed in a 20% or higher and 50% or lower sodium hydroxide aqueous solution for preferably 0.5 hours or longer and 58 hours or shorter and more preferably 1 hour or longer and 5 hours or shorter for partial deacetylation treatment. Then, the partially deacetylated raw material a is sufficiently washed by filtration-water washing until the filtrate becomes neutral. The degree of N-acetylation of the raw material a is reduced by partial deacetylation, and therefore the raw material a is in a state suitable for nanofiber formation. The chitin contained in the raw material a has a chitosan structure in part due to partial deacetylation and therefore has an amino group.

On the other hand, in a case where the raw material b (beta chitin), which is a wet spear squid soft cuttlebone crushed to about 1 cm, is subjected to the above-mentioned purification treatment, a sufficient amount of amino groups are exposed on the surface of the chitin crystal by the above-mentioned purification treatment and therefore, the partial deacetylation treatment is not always necessary.

(2) Immersion Treatment

Next, the purified chitin and/or chitosan obtained in the step of (1) above is immersed in a pH-adjusted liquid. The immersion in a liquid having a pH suitable for the introduced ionic functional group facilitates defibration due to charge repulsion between chitin microfibrils.

In a case where an amino group is introduced by a partial deacetylation treatment, it is preferable to immerse the purified chitin and/or chitosan in an acidic liquid having a pH adjusted to 5 or lower.

As the acidic liquid, any acid can be used as long as a pH in a desired range can be obtained. That is, the acid may be an organic acid or an inorganic acid, and is not particularly limited.

In addition, the solvent of the acidic liquid is not particularly limited, and a solvent other than water may be used.

Examples of the organic acid include formic acid, acetic acid, citric acid, malic acid, oxalic acid, salicylic acid, ascorbic acid, tartaric acid, gluconic acid, lactic acid, fumaric acid, succinic acid, sodium succinate, phytic acid, adipic acid, propionic acid, glyoxylic acid, pyruvic acid, acetoacetic acid, levulinic acid, heptanoic acid, caprylic acid, capric acid, lauric acid, glycolic acid, glyceric acid, acrylic acid, benzoic acid, para-nitrobenzoic acid, para-toluenesulfonic acid, picric acid, and maleic acid. Examples of the inorganic acid include phosphoric acid, hydrochloric acid, sulfuric acid, nitric acid, and disodium dihydrogen pyrophosphate.

However, in a case where the obtained chitin nanofibers are used for incorporation into a living body such as a medicine, a food, or a drug, it is preferable to use an edible acid such as acetic acid, citric acid, or malic acid, and to use water as a solvent. This is because the removal of the acid or solvent used for preparing the nanofibers becomes unnecessary or extremely easy, which is also effective in terms of safety.

In the present embodiment, adjusting the pH of the acidic liquid is extremely important. In a case where the pH of the acidic liquid exceeds 5, the chitin nanofibrils cannot be separated into individual pieces even in a case where the defibration treatment is carried out. It is considered that this is because imparting of charge to glucosamine constituting alpha chitin becomes insufficient, and therefore the charge repulsion between chitin microfibrils becomes insufficient. In addition, the solid content concentration in the acidic liquid in which the purified chitin is immersed is preferably 5% or less. This is to avoid insufficient imparting of charge to glucosamine.

(3) Defibration Treatment

Next, the liquid in which the purified chitin is immersed is subjected to a defibration treatment. A dispersion liquid of chitin nanofibers separated into individual pieces is obtained by this defibration treatment. The chitin nanofiber contained in such a dispersion liquid is a chitin nanofiber consisting of chitin that has not been chemically modified, having a width of 5 nm to 50 nm, and having a length of 300 nm or longer which has not been realized so far by nanofibers made from chitin as a raw material.

The defibration treatment can be carried out using a defibrating and crushing device such as a household mixer (a propeller mixer or a cutter mixer), an ultrasonic application device, an ultrasonic homogenizer, a high-pressure homogenizer, or a twin-screw kneader. In addition, a plurality of defibration treatments by these devices may be combined. For example, after the defibration treatment with a household mixer, the defibration treatment with an ultrasonic application device may be carried out.

In the present embodiment, since the nanofiber formation is carried out by utilizing the charge repulsion between chitin nanofibrils, the energy given to chitin purified by the defibration treatment can be suppressed to a low level. Therefore, even a simple device such as a household mixer can be sufficiently applied. In addition, since the defibration treatment time is only several minutes, nanofibers can be produced with extremely excellent efficiency.

The acidic liquid in which the purified chitin is immersed may be diluted during the defibration treatment. In a case where the purified alpha chitin is converted into nanofibers by the defibration treatment, it becomes a highly viscous dispersion liquid, so it is preferable to reduce the solid content concentration in advance by diluting the dispersion liquid. This makes it possible to smoothly carry out stirring in the defibration treatment. The solid content concentration after dilution is preferably 1% or less, more preferably 0.5% or less, and still more preferably 0.2% or less.

At the time of dilution, a solvent such as water or an acid solution is added to the acidic liquid. The addition of a solvent raises the pH of the acidic liquid, but has little effect on the yield of the defibration treatment in a case where a sufficient amount of charges are imparted to the glucosamine component of the purified chitin in the immersion treatment. In addition, a solvent other than water may be contained. A hydrophilic solvent is preferable as the solvent other than water. The hydrophilic solvent is not particularly limited, but alcohols such as methanol, ethanol, and isopropanol; and cyclic ethers such as tetrahydrofuran are preferable.

In addition, if necessary, it is preferable to remove the purified chitin that remains undispersed in the defibration treatment by filtration, centrifugation, or the like.

By the above steps (1) to (3), the chitin and/or chitosan raw material is defibrated in a solvent to obtain a dispersion liquid of fine fibers 1.

In particular, a dispersion liquid containing chitin nanofibers separated into individual pieces can be obtained by an extremely simple step of subjecting the purified chitin to a partial deacetylation treatment to reduce the degree of N-acetylation and immersing the partially deacetylated chitin in a pH-adjusted acidic liquid and then subjecting it to a defibration treatment. Composite particles 5 having good dispersibility and uniform particle size can be obtained by using such chitin nanofibers.

Since the obtained chitin nanofibers consist of non-chemically modified chitin and/or chitosan and do not require safety confirmation, it will be much easier to develop applications thereof in applications that are taken into the body and used, especially in the fields of food, medical care, drugs, healthcare, and the like. In addition, the chitin nanofiber dispersion liquid obtained in the above step is a transparent high-viscosity liquid, and can be used as it is for foods and medical materials depending on the type of acid to be added.

In addition, the dispersion of the fine fibers 1 may contain other components, if necessary, as long as the effects of the present invention are not impaired. The other components are not particularly limited, and can be appropriately selected from known additives depending on the application of the composite particle 5 and the like. Specific examples thereof include an organometallic compound or a hydrolysate thereof such as alkoxysilane, an inorganic layered compound, an inorganic acicular mineral, an antifoaming agent, an inorganic particle, an organic particle, a lubricant, an antioxidant, an antistatic agent, an ultraviolet absorber, a stabilizer, a magnetic powder, an orientation promoter, a plasticizer, a cross-linking agent, a magnetic substance, a pharmaceutical product, an agricultural chemical, a fragrance, an adhesive, an enzyme, a pigment, a dye, a deodorant, a metal, a metal oxide, and an inorganic oxide.

(Second Step)

The second step is the same as that of the first embodiment.

(Third Step)

The third step is the same as that of the first embodiment.

It is preferable to adjust the pH of the recovered composite particles 5 to facilitate dispersion. In a case where the fine fiber 1 having an amino group is used, the pH is adjusted in a range of 2 to 7 with acetic acid or the like. By ionic bonding of the added acid with the amino group on the surface of the fine fiber 1, the amino group tends to have a positive charge, and the composite particles 5 are easily dispersed with each other. In particular, the composite particles 5 can be suitably dispersed by adjusting the pH to about 3.3.

(Fourth Step)

The fourth step is a step of adsorbing a compound (for example, a drug) that forms an ionic bond in a pair with an ionic functional group of the fine fiber 1 onto the fine fiber 1 in the surface of the composite particle 5. In the present embodiment, a drug is adsorbed onto the fine fiber 1. A drug aqueous solution can be mixed with the dispersion liquid of the composite particles 5 obtained after the third step. Alternatively, the drug can be adsorbed onto the fine fiber 1 in such a manner that the composite particles 5 obtained after the third step are supported on a base material or the like, and the drug aqueous solution is brought into contact with the composite particles.

As the drug to be used, the same drug as that described in the first embodiment can be used.

The composite particle 5 has an increase in ionicity of the fine fiber 1 by lowering the pH, and therefore easily adsorbs a compound that forms an ionic bond. In this case, the pH range is preferably in a range of pH 1 to pH 7.

The supported drug amount varies depending on the amount of the ionic functional group of the composite particle 5, the particle size of the composite particle 5, and the like. For example, a larger charge amount of the ionic functional group of the composite particle 5 leads to a larger supported drug amount. In addition, a smaller particle size of the composite particles 5 leads to an increased specific surface area of the composite particles per unit volume, which in turn leads to an increase in supported drug amount.

The adsorption of the drug onto the fine fibers 1 is generated not only by the above-mentioned ionic bond but also by the van der Waals force. The drug is adsorbed onto the surface of the fine fibers 1 by the van der Waals force acting between the fine fibers 1. The drug adsorbed onto the composite particles 5 by the van der Waals force is pH-independent and can be washed away with a solvent or the like that is easily compatible with the drug, if necessary.

(Drug Release)

The composite particles 5 in which the drug is adsorbed onto the surface thereof are exposed to a buffer solution (0.1 M) having a pH different from the pH adjusted in the third step. The buffer solution is, for example, an acetate buffer solution, a phosphate buffer solution, a citrate buffer solution, a phosphate-citrate buffer solution, or a formate buffer solution. Since the adsorption of the drug onto the fine fibers 1 is pH-dependent, the adsorbed drug is released from the composite particles 5 depending on the adjusted pH.

The composite particle 5 according to the present embodiment is a novel composite particle derived from the fine fibers 1 on the surface of the composite particle 5 and having high biocompatibility and good dispersion stability without aggregation even in a solvent.

In addition, since the dry solid material containing the composite particles 5 according to the present embodiment is obtained as a fine powder and the particles do not aggregate with each other, it is also easy to redisperse the composite particles 5 obtained as a dry powder in a solvent again, and a compound such as a drug adsorbed onto the fine fibers 1 can be released into the solvent depending on the pH environment of the solvent.

Although the second embodiment of the present invention has been described in detail with reference to the accompanying drawings, the specific configuration is not limited to this embodiment and includes design changes and the like within a scope of the present invention as claimed. In addition, the constituent elements shown in the above-described embodiment can be appropriately combined and configured.

The invention claimed is:

1. A composite particle comprising:
a core particle containing at least one polymer; and
a chitin nanofiber layer formed of chitin nanofibers on a surface of the core particle,
wherein the core particle and the chitin nanofibers are bonded to each other in an inseparable state, an amount of an ionic functional group of the composite particle is 0.0002 mmol/g or greater and 0.5 mmol/g or less with respect to a dry weight of the composite particle, and the chitin nanofibers are fibrous chitin having a number average minor axis diameter of 1 nm or longer and 1000 nm or shorter, and a number average major axis diameter of 50 nm or longer; and the number average major axis diameter is 5 or more times longer than the number average minor axis diameter.

2. The composite particle according to claim 1, wherein the ionic functional group is introduced into the chitin nanofibers.

3. The composite particle according to claim 1, wherein an amount of the ionic functional group of the chitin nanofibers constituting the chitin nanofiber layer is 0.1 mmol/g or greater and 3.0 mmol/g or less with respect to a dry weight of the chitin nanofibers constituting the chitin nanofiber layer.

4. The composite particle according to claim 1, wherein the core particle is obtained by polymerizing a polymerizable monomer having a polymerizable functional group.

5. The composite particle according to claim 4, wherein the polymerizable monomer is divinylbenzene.

6. The composite particle according to claim 1, wherein the core particle is a biodegradable polymer.

7. The composite particle according to claim 1, wherein a solid content percentage of the composite particle is 80% or more.

8. A composite-particle composition comprising:
a compound that forms an ionic bond in a pair with the ionic functional group of the chitin nanofibers being adsorbed onto a surface of the composite particle according to claim 1.

9. A method for producing a composite-particle composition comprising:

a first step of obtaining a dispersion liquid of chitin nanofibers;

a second step of coating a surface of liquid droplets of a polymerizable monomer or a polymer with the chitin nanofibers in the dispersion liquid to stabilize the liquid droplets as an emulsion;

a third step of polymerizing the liquid droplets of the polymerizable monomer or the polymer to obtain composite particles including the polymer coated with the chitin nanofibers;

a fourth step of adsorbing a compound that forms an ionic bond in a pair with an ionic functional group of the chitin nanofibers onto the chitin nanofibers in a surface of the composite particles, and the chitin nanofibers are fibrous chitin having a number average minor axis diameter of 1 nm or longer and 1000 nm or shorter, and a number average major axis diameter of 50 nm or longer; and the number average major axis diameter is 5 or more times longer than the number average minor axis diameter.

10. The method for producing a composite-particle composition according to claim 9, wherein the fourth step controls a pH.

11. The composite particle according to claim 2, wherein an amount of the ionic functional group of the chitin nanofibers constituting the chitin nanofiber layer is 0.1 mmol/g or greater and 3.0 mmol/g or less with respect to a dry weight of the chitin nanofibers constituting the chitin nanofiber layer.

12. The composite particle according to claim 2, wherein the core particle is obtained by polymerizing a polymerizable monomer having a polymerizable functional group.

13. The composite particle according to claim 3, wherein the core particle is obtained by polymerizing a polymerizable monomer having a polymerizable functional group.

* * * * *